Sept. 28, 1971     W. RUDSZINAT ET AL     3,608,270

MACHINE FOR PACKAGING ROD SHAPED ARTICLES

Filed May 26, 1969     16 Sheets-Sheet 2

Inventor:
WILLY RUDSZINAT
OTTO ERDMANN
WOLFGANG ZAUSIN

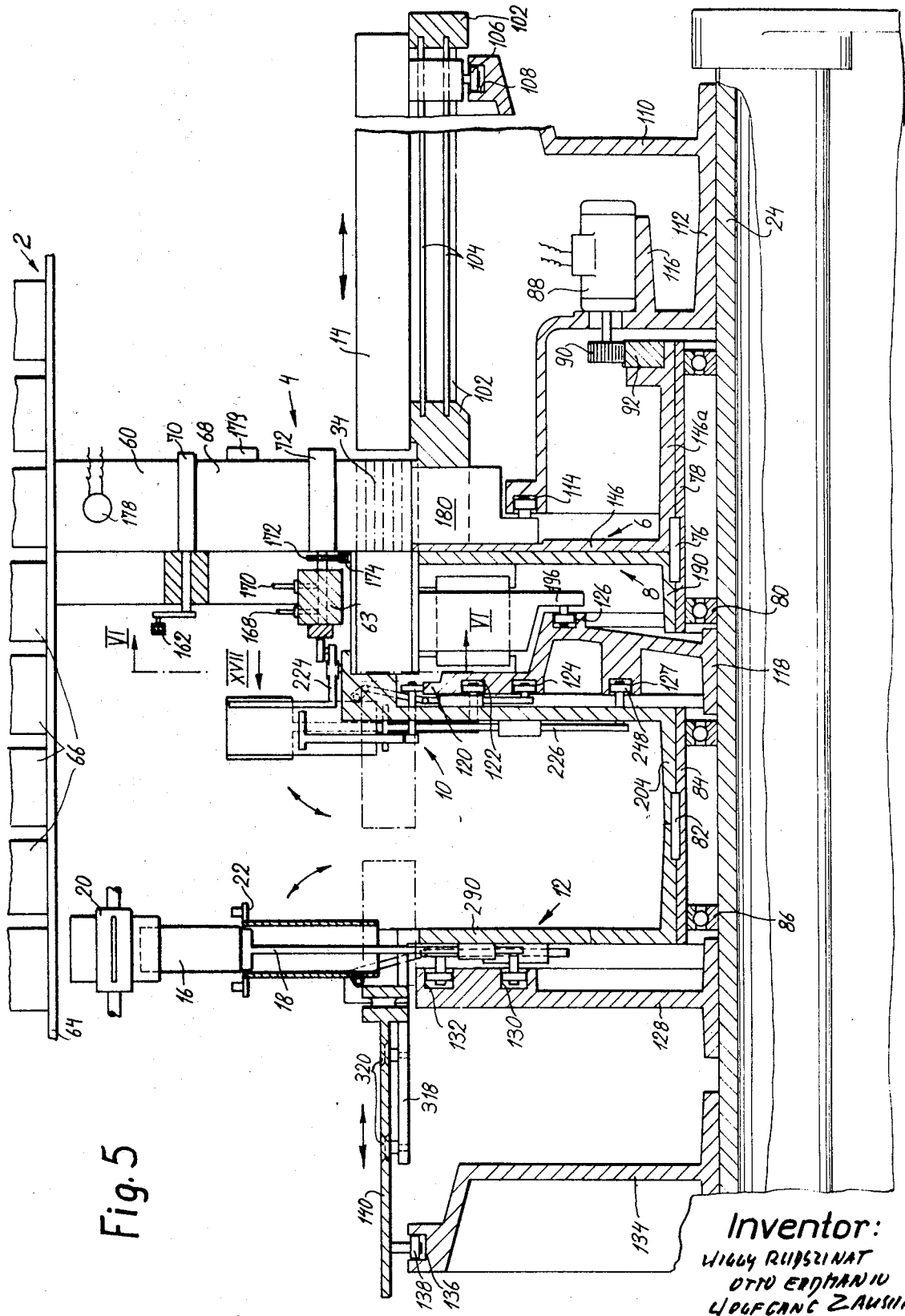

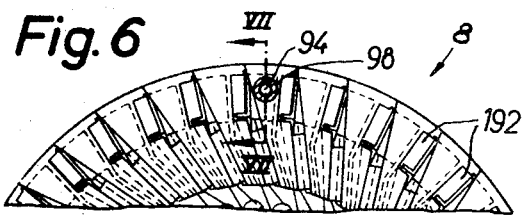
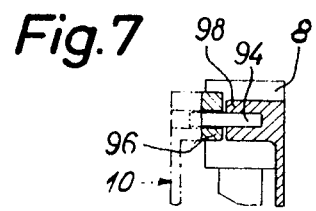
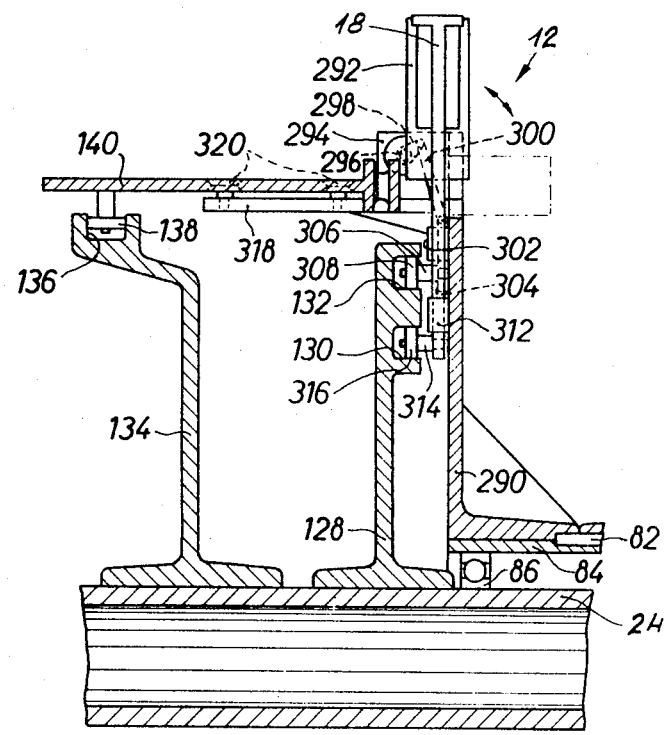

Sept. 28, 1971  W. RUDSZINAT ET AL  3,608,270
MACHINE FOR PACKAGING ROD SHAPED ARTICLES
Filed May 26, 1969  16 Sheets-Sheet 10

Inventor:
WILLY RUDSZINAT
OTTO ERDMANN
WOLFGANG ZAUSCH
By: Michael S. Striker
Attorney

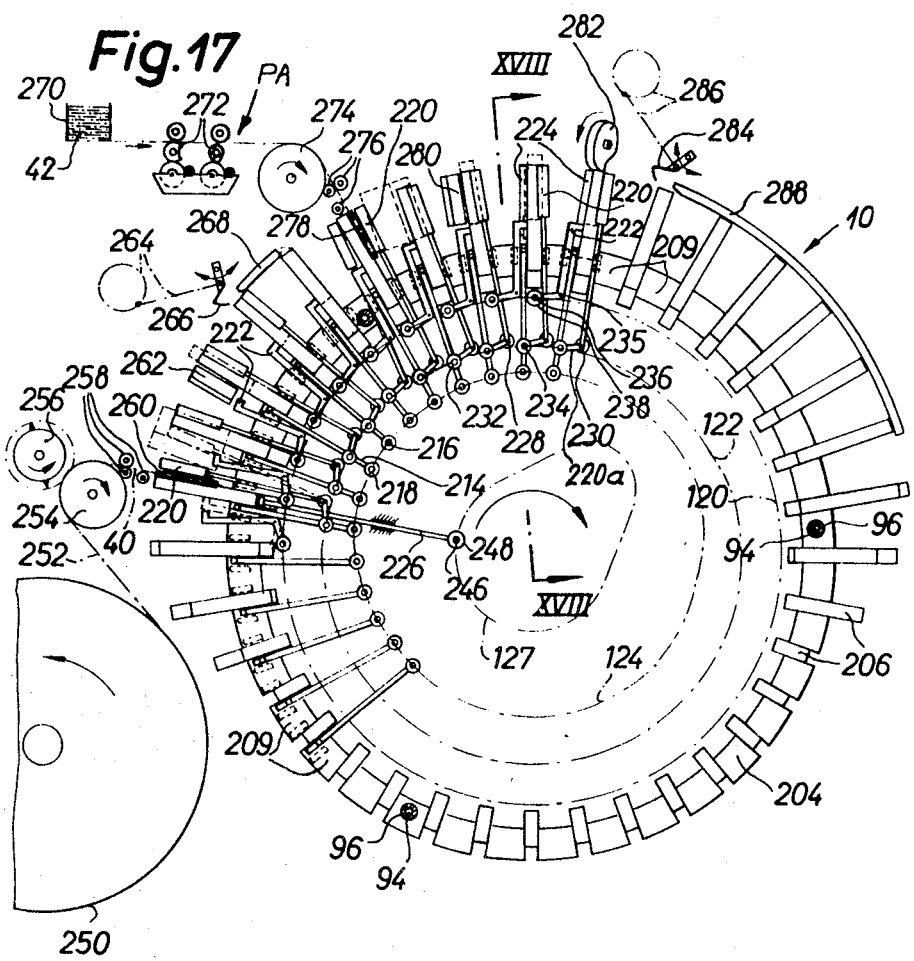

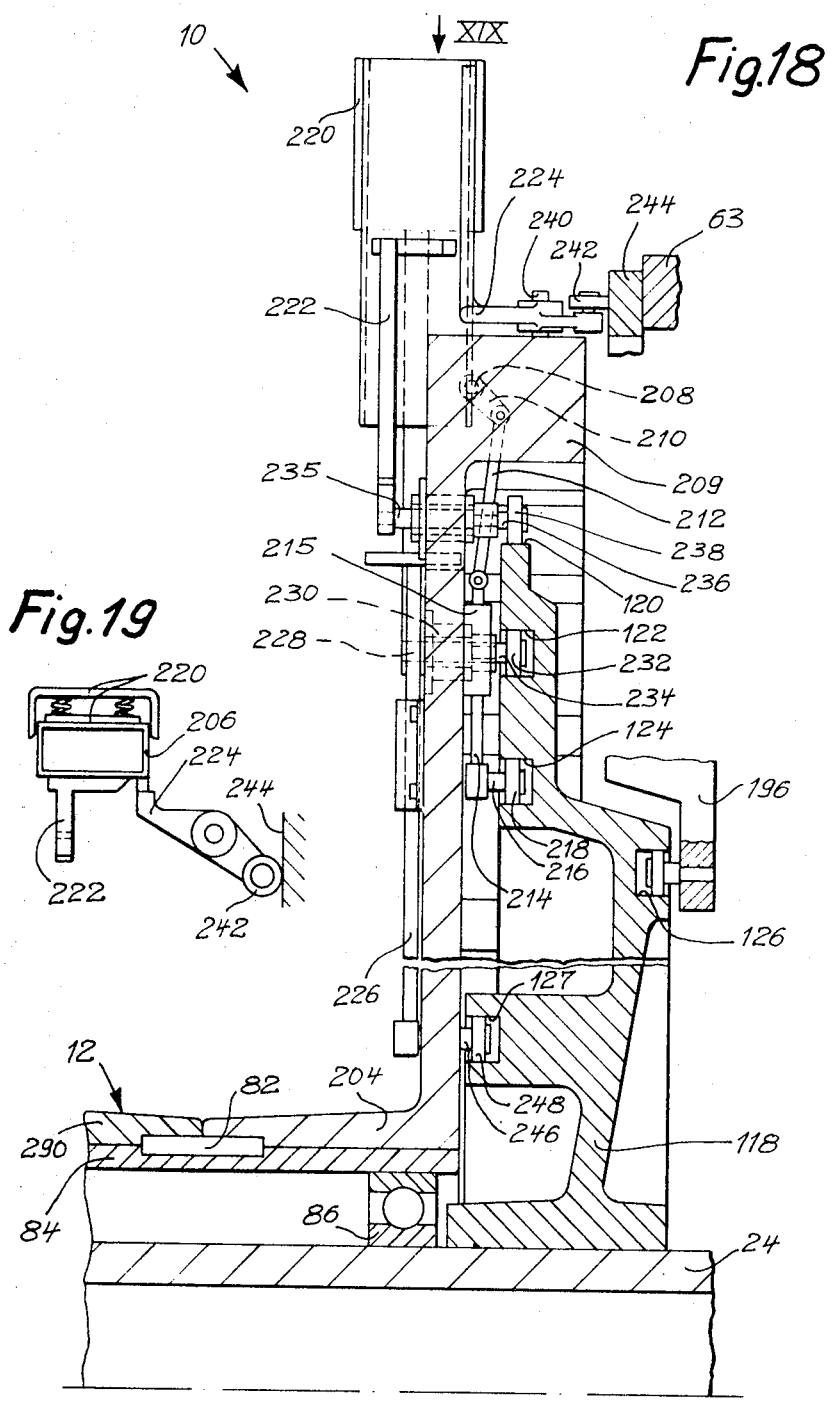

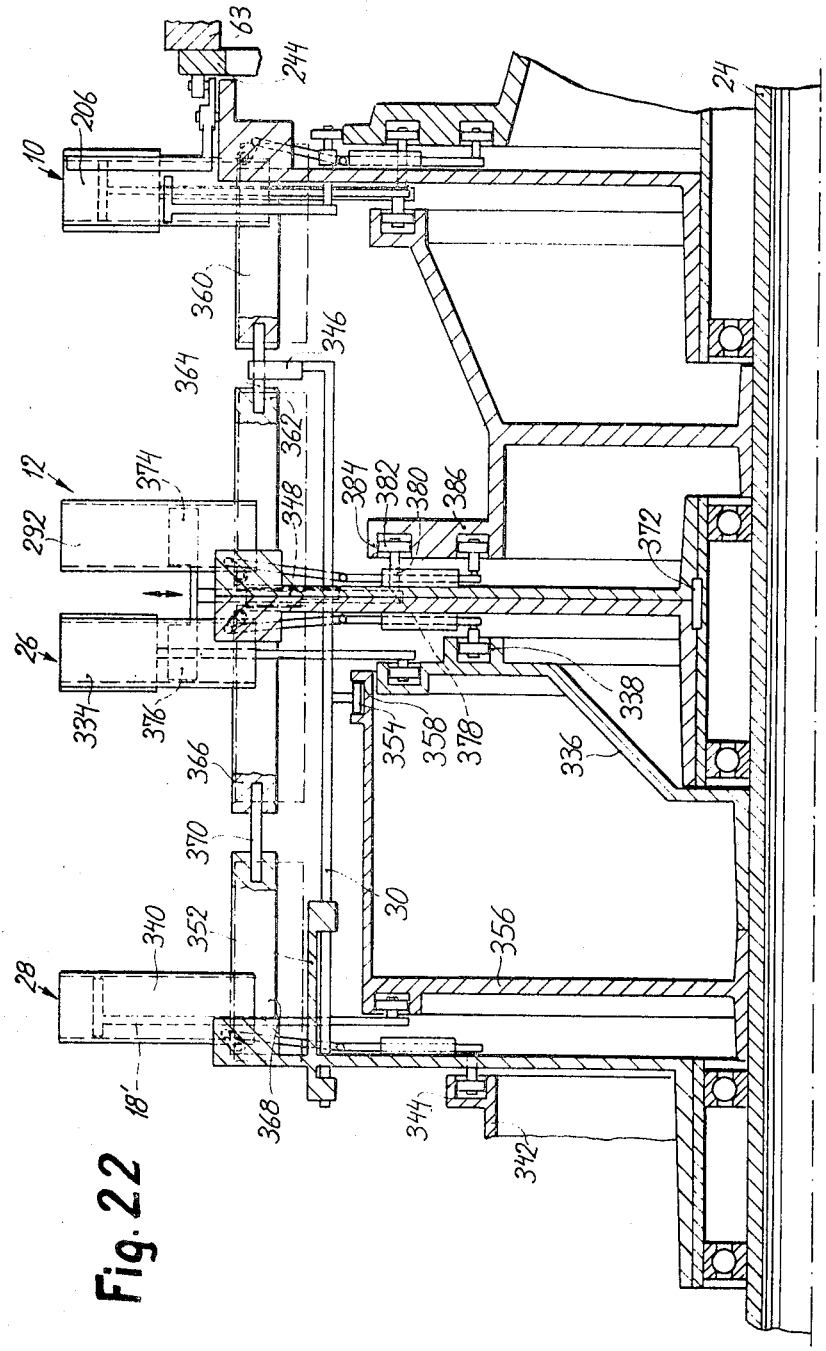

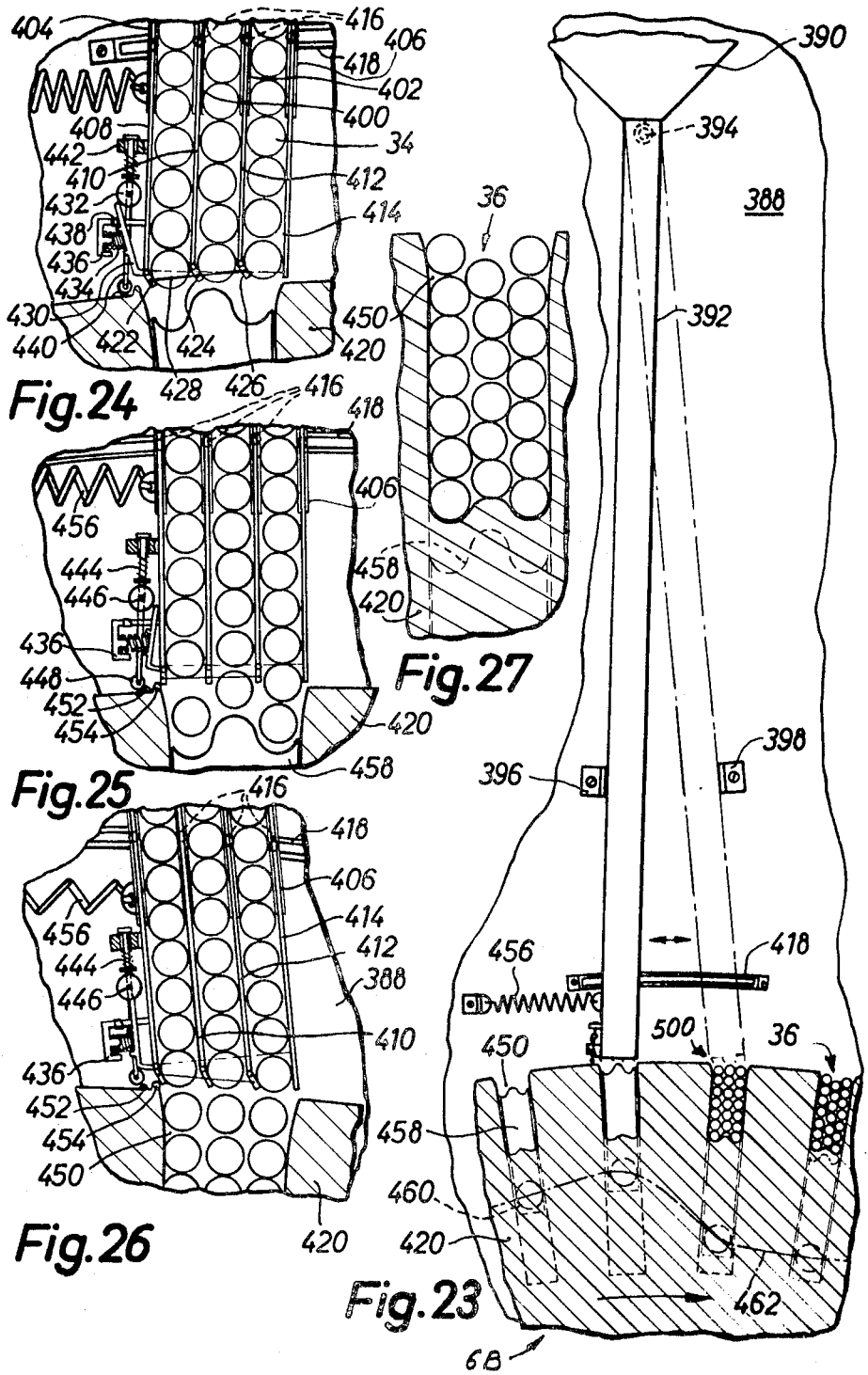

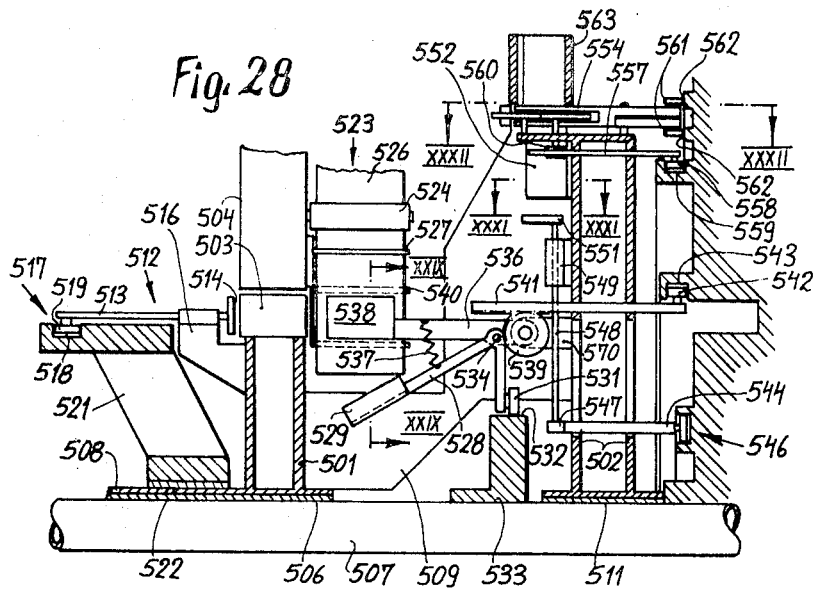
Fig. 28
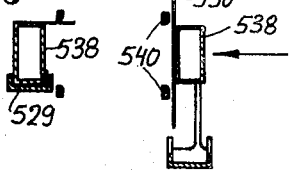
Fig. 30  Fig. 29
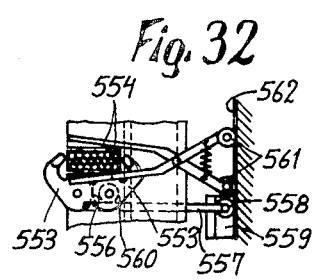
Fig. 32
Fig. 31

3,608,270
MACHINE FOR PACKAGING ROD
SHAPED ARTICLES
Willy Rudszinat, Dassendorf, Otto Erdmann, Hamburg-Bergedorf, and Wolfgang Zausch, Hamburg, Germany, assignors to Hauni-Werke Koerber & Co. K.G., Hamburg-Bergedorf, Germany
Continuation-in-part of application Ser. No. 582,106, Sept. 26, 1966. This application May 26, 1969, Ser. No. 827,808
Claims priority, application Germany, Oct. 12, 1965, H 57,397
Int. Cl. B65b 19/04, 19/24, 63/02
U.S. Cl. 53—124E                                        64 Claims

ABSTRACT OF THE DISCLOSURE

Cigarettes or like rod-shaped smoking articles are introduced into and sealed in packs by withdrawing them from a magazine, moving the thus withdrawn articles sideways and assembling moving articles into block-shaped groups, converting blanks of sheet material into open-ended packs which accommodate groups of articles, and sealing the open ends of successive packs.

CROSS-REFERENCE TO RELATED APPLICATION

This is a continuation-in-part of Ser. No. 582,106, filed Sept. 26, 1966 and now abandoned.

BACKGROUND OF THE INVENTION

The present invention relates to a method and machine for packaging cigarettes or similar rod shaped articles. More particularly, the invention relates to a method and machine for packaging accurately arrayed groups of rod shaped articles.

At the present, two types of packaging method and machines enjoy widespread use in the tobacco processing industry. Packaging machines of the first type, also known as straight machines, operate upon groups of cigarettes which advance lengthwise of the cigarettes along a straight path. Packaging machines of the second type, also known as revolver type machines, utilize turrets on which the groups of cigarettes are wrapped into one or more blanks while travelling sideways about a fixed axis. In such revolver type machines, the groups of cigarettes are advanced intermittently because the unit which forms groups or blocks of cigarettes by withdrawing them from a source utilizes an intermittently operated plunger or ejector. Intermittent operation imposes limits upon the output of conventional packaging machines. This is due mainly to the fact that the speed of the plunger cannot be raised beyond a certain practical limit because the feed which supplies cigarettes to the plunger comprises one or more channels or shafts, and it takes some time before the channels are refilled with cigarettes which descend by gravity. Furthermore, an operataion of the plunger at an excessive speed invariably results in deformation of or other damage to the cigarettes when the rapidly moving plunger strikes against a group or block.

SUMMARY OF THE INVENTION

It is an important object of the present invention to provide a method and a machine for packaging cigarettes or similar rod shaped articles in such a way that the output of the packaging machine can be increased well above the output of conventional packaging machines without in any way affecting the accuracy of the operation and without causing any damage to the articles.

Another object of the invention is to provide a method and a machine for accommodating and sealing blocks or groups of properly arrayed cigarettes or like rod shaped artiles in packs of the type which are presently preferred by smokers and which may include one, two or more layers of metallic foil, paperboard, transparent plastic sheet stock, or other suitable wrapping material.

A further object of the invention is to provide a packaging machine which, though normally used to form packs with two layers or envelopes of wrapping material each, can be readily converted into a machine for making three-layer packs or packs composed of four or more layers, and vice versa.

An additional object of the instant invention is to provide a method of producing filled cigarette packs of the type wherein a revenue label or stamp seals the top end of the pack and wherein such revenue label is thereupon surrounded by a transparent wrapper or envelope of Celluloid or similar synthetic plastic material.

Still another object of the invention is to provide an improved revolver type packaging machine for cigarettes or the like and to construct the machine in such a way that its turrets can rotate without interruptions and at a constant speed.

A concomitant object of the invention is to provide a revolver type packaging machine wherein two or more units may be assembled of identical or similar component parts.

A further object of our invention is to provide a packaging machine whose operation is fully automatic and wherein not only the delivery of fresh rod shaped articles but also the ejection and further transfer of finished packs take place without any assistance by the operators.

Another object of the invention is to provide a packaging machine which is constructed and assembled in such a way that it can take up and process the output of two or more modern cigarette making machines and which can be assembled with such machines into a production line.

An additional object of the invention is to provide a novel system of conveyors and drive means therefor which may be utilized in a packaging machine of the above outlined characteristics.

A further object of the invention is to provide a novel method of converting a batch of cigarettes or similar rod shaped articles into groups or blocks of accurately arrayed articles which are ready for immediate transfer into cigarette packs or analogous containers.

Still another object of the invention is to provide a novel method of transferring groups or blocks of accurately arrayed rod shaped articles between successive conveyors of a revolver type packaging machine.

An additional object of the invention is to provide a method of forming, filling and sealing successive cigarette packs by resorting to a compact, high-speed, reliable and relatively inexpensive packaging machine.

Another object of the invention is to provide a method according to which each of a series of successively assembled groups of articles may be formed in a series of successive stages and wherein such mode of assembling the groups results in substantially increased output of the packaging machine.

A further object of the invention is to provide a novel method of withdrawing cigarettes or other rod shaped articles from a source of supply and of assembling the thus withdrawn articles in groups each of which contains a desired number of parallel articles.

An ancillary object of the invention is to provide simple, compact and readily accessible blank feeding, draping, retaining, folding, tucking, closing and sealing instrumentalities for use in the improved packaging machine.

One feature of our invention resides in the provision of a method of packaging cigarettes or similar rod shaped smoking articles which comprises the steps of withdrawing articles from a source of supply, moving the thus withdrawn articles sideways and assembling the moving articles in successive groups each of which constitutes a block-shaped commodity and contains a predetermined number of accurately arrayed parallel articles (for example, each commodity may consist of twenty articles), converting successive blanks of tinfoil, transparent plastic, paperboard and/or other suitable wrapping or packaging material into empty packs each of which has an open end and each of which accommodates a group of articles, and sealing the open ends of successive packs.

The method preferably comprises the additional step of shifting successively filled moving packs axially of the articles prior to sealing of their ends.

In accordance with another advantageous feature of our invention, the assembling step may include delivering the articles of the aforementioned groups by gravity feed and sideways from a higher level to a lower level so that at least some of successively delivered articles come to rest on previously delivered articles and the groups grow gradually until each group contains a predetermined number of articles, and lowering the growing groups so that each successively delivered article descends by substantially the same distance. Such lowering may be carried out in the chambers of a continuously revolving turret which travels below a station where the articles descend from a higher level to a lower level, i.e., into the chambers of the revolving turret. Each chamber may be provided with a bottom wall which is movable with reference to the turret or vice versa and which causes the growing groups to enter deeper into the respective chambers at the same rate as the number of superimposed strata of articles in such chambers increases.

It is also within the purview of our invention to apply at least one additional layer or envelope of wrapping material around successive sealed packs whereby the sealed packs preferably move sideways (i.e., at right angles to the axes of the articles therein), at least during a portion of the layer applying step. Such additional layers may consist of transparent or translucent material.

It is further preferred to include a condensing or compacting step in the course of which successively arrayed groups of articles are subjected to compressive stresses acting in directions at right angles to their axes to effect a reduction in the cross-sectional dimensions of such groups and to make sure that each of the thus condensed groups can be readily fitted into the respective pack. The shifting of groups into the respective packs can be carried out in two steps, and the condensing step preferably follows immediately the first shifting step and is carried out while the articles of the groups move sideways.

The novel features which are considered as characteristic of the invention are set forth in particular in the appended claims. The improved packaging machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is an enlarged axial sectional view of the upper half of the cigarette packaging machine whose parts are shown in FIG. 1 by solid lines and which is utilized to insert and to seal groups of arrayed cigarettes in packs consisting of two layers or envelopes each;

FIG. 6 is a fragmentary transverse vertical sectional view, substantially as seen in the direction of arrows from the line VI—VI of FIG. 5 and illustrates a portion of the coupling between the compacting and pack building conveyors of the packaging machine;

FIG. 7 is a section as seen in the direction of arrows from the line VII—VII of FIG. 6, with the pack building conveyor indicated by phantom lines;

FIG. 17 is an end elevational view of a pack building conveyor which is utilized in the packaging machine of FIG. 5;

FIG. 18 is a fragmentary axial sectional view, substantially as seen in the direction of arrows from the line XVIII—XVIII of FIG. 17;

FIG. 19 is an enlarged fragmentary view of a detail, substantially as seen in the direction of the arrow XIX in FIG. 18;

FIG. 21 is an enlarged fragmentary axial sectional view, substantially as seen in the direction of arrows from the line XXI—XXI of FIG. 20;

FIG. 22 is a fragmentary axial sectional view of a packaging machine which embodies all of the components indicated in FIG. 1 by solid lines and by phantom lines, this machine being utilized to form cigarette packs each of which comprises more than two layers or envelopes;

FIG. 23 is a fragmentary and elevational view of a further packaging machine wherein the feed which delivers cigarettes to the chambers of the groups forming conveyor comprises a single chute whose discharge end is oscillatable between two fixed end positions;

FIG. 24 is an enlarged fragmentary vertical sectional view of the discharge end of the oscillatable chute with its component parts shown in closed positions to prevent evacuation of cigarettes;

FIG. 25 illustrates the structure of FIG. 24 but with the parts of the chute in fully open positions during filling of a chamber in the turret of the group forming conveyor;

FIG. 26 again shows the structure of FIG. 24 but with the parts of the chute in partly closed positions;

FIG. 27 is an enlarged fragmentary vertical sectional view of the turret in the group forming conveyor shown in FIG. 23 and illustrates a group of properly arrayed cigarettes in the chamber of this turret;

FIG. 28 is a fragmentary axial sectional view of a further packaging machine wherein the chambers of the group forming conveyor are radially offset with reference to the chambers of a pack building and sealing conveyor system;

FIG. 29 is a fragmentary sectional view as seen in the direction of arrows from the line XXIX—XXIX of FIG. 28 and illustrates the manner of delivering a blank into the machine of FIG. 28;

FIG. 30 is a similar sectional view but showing the blank of FIG. 29 in partly deformed condition;

FIG. 31 is a fragmentary sectional view as seen in the direction of arrows from the line XXXI—XXXI of FIG. 28 and illustrates a further stage of transport of the blank shown in FIG. 30; and FIG. 32 is a fragmentary sectional view as seen in the direction of arrows from the line XXXII—XXXII of FIG. 28 and illustrates certain deforming elements which treat the ends of a blank subsequent to conversion into a tube.

DESCRIPTION OF THE PREFERRED EMBODIMENTS

Figure 1:
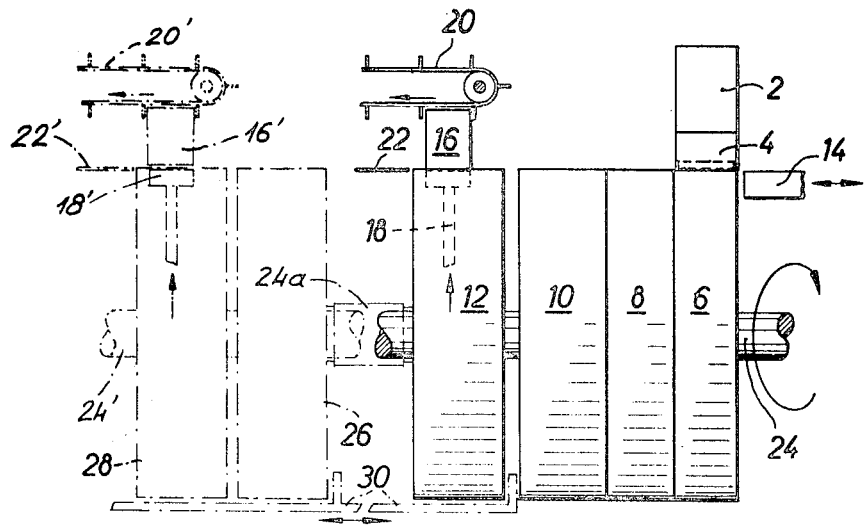
FIG. 1 is a schematic side elevational view of a cigarette packaging machine which embodies one form of our invention, certain optional components of the packaging machine being indicated by phantom lines.

Referring to the drawing in detail, and first to FIG. 1, there is shown a packaging machine which may be utilized to introduce properly arrayed groups or blocks of twenty cirgarettes each into packs each of which comprises two or three layers or envelopes, for example, an inner layer of metallic foil, a median layer of paperboard, and an outer layer of transparent or translucent plastic material. Basically, the packaging machine comprises a main source 2 of cigarettes which may include a conveyor 64 (see FIG. 5) for a series of filled cigarette trays 66 and a magazine or hopper 60 which receives cigarettes from successive trays 66. Referring again to FIG. 1, the machine further includes a feed 4 whose construction and mode of operation will be described in connection with FIGS. 5 and 8 to 11 and which comprises a set of feeding elements serving to withdraw cigarettes from the hopper 60 and to deliver the thus withdrawn cigarettes sideways to successive pockets or chambers of a first endless conveyor 6, hereinafter called group forming conveyor. This conveyor 6 comprises a rotary turret or drum whose receiving means or chambers can accumulate groups of twenty cigarettes each. The exact construction and operation of the conveyor 6 will be described in connection with FIGS. 12 and 13. It suffices to say here that the conveyor 6 cooperates with a series of orbiting transfer members or pushers 14 (only one shown in FIG. 1) whose function is to displace or shift successively assembled groups or blocks of cigarettes into the receiving means or chambers or tunnels of a second endless conveyor 8, hereinafter called compressing or condensing conveyor, which is immediately adjacent to and rotates with the conveyor 6. The conveyors 6 and 8 are mounted on a main shaft 24 which latter also carries an endless "pack building" conveyor 10. The conveyor 10 in part carries and in part cooperates with deforming means for building partially completed or partially finished packs each of which includes an inner layer or envelope of metallic foil and a surrounding outer layer or envelope of paperboard. The pushers 14 orbit at the speed of the conveyors 6, 8 and 10 and their strokes are long enough to shift compressed groups of cigarettes from the tunnels of the conveyor 8 through the open ends of and into the partially finished packs on the pack building conveyor 10. The main shaft 24 further carries a fourth endless conveyor 12, hereinafter called sealing or finishing conveyor, which is adjacent to and receives filled packs from the conveyor 10. The conveyor 12 is provided with and cooperates with deforming means for closing and sealing the still open ends of filled packs and to thereupon deliver finished packs 16 into the range of a transfer conveyor 20 which supplies finished packs to a take-off conveyor 22 serving to deliver such packs to a furtherprocessing station (for example, to a carton filling machine) or to storage. The strokes of the pushers 14 are long enough to shift filled packs from the pack building conveyor 10 onto the sealing conveyor 12, and the latter is provided with radially movable ejectors or plungers 18 serving to eject finished packs 16 and to thus move such packs into the range of the transfer conveyor 20. The conveyors 6, 8, 10 and 12 are driven continuously at the same peripheral speed and in the same direction by a common drive unit which will be described in connection with FIG. 5.

If the packs which are built up on the conveyor 10 should be provided with outer layers or envelopes of transparent plastic material, the packaging machine of FIG. 1 comprises two additional endless conveyors including a second "pack building" conveyor 26 and a second "sealing" or finishing conveyor 28. The conveyors 20, 22 then respectively assume the positions 20', 22' which are indicated by phantom lines, and the finished packs 16' (each of which is assembled of three layers) are then ejected by radially movable ejectors or plungers 18' carried by the second sealing conveyor 28. The plungers 18 of the conveyor 12 are then inactive or are dispensed with. The two additional conveyors 26, 28 may be mounted on the main shaft 24 or on a separate main shaft 24' which is coaxial with the shaft 24, and the conveyors 26, 28 may be rotated by the drive unit for the conveyors 6, 8, 10, 12 through the intermediary of a clutch 24a which transmits torque from the conveyor 12 to the conveyor 26. The means for shifting or displacing packs 16 from the sealing conveyor 12 to the second pack building conveyor 26 and thence to the second sealing conveyor 28 comprises a second set of transfer members or pushers 30. The provision of this second set of pushers 30 is advisable because, otherwise, the pushers 14 would have to perform very long strokes.

The endless conveyors 6, 8, 10, 12, 26 and 28 are preferably placed into immediate or close proximity of each other so that the overall length of the packaging machine is surprisingly short. This contributes to a higher output because the cigarettes and packs must cover very short distances during shifting between adjoining conveyors. Also, the drive for the conveyors is very simple because its components transmit motion through short distances.

Figure 2:
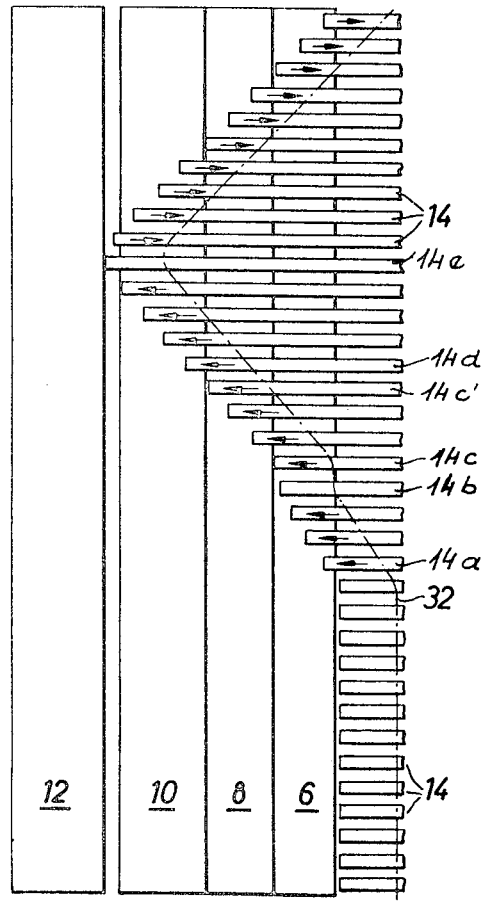
FIG. 2 is a developed view of certain components which are shown in FIG. 1 and illustrates various stages in the axial movement of a set of transfer members or pushers which serve to shift groups of accurately arrayed cigarettes and partly finished packs in the axial direction of four endless conveyors.

FIG. 2 illustrates the pushers 14 and the endless conveyors 6, 8, 10 and 12 in a developed view. While orbiting about the axis of the main shaft 24, the pushers 14 are assumed to travel from the bottom to the top of FIG. 2 and simultaneously perform working and return strokes of predetermined length by moving in parallelism with the axis of the main shaft. In the lowermost part of FIG. 2, the pushers 14 are shown in fully retracted positions, i.e., they do not extend into the chambers of the group forming conveyor 6 so that such chambers can accumulate groups or blocks of twenty cigarettes each. When the foremost chamber of the conveyor 6 accommodates a group of twenty properly arrayed parallel cigarettes, the corresponding pusher 14a begins to move axially of the main shaft 24 and in a direction to the left, as viewed in FIG. 2, so as to shift the freshly assembled group into the registering tunnel of the compressing conveyor 8. During actual compression of the group, the registering pusher 14b interrupts its leftward axial movement to allow for satisfactory compression of the group in a manner as will be explained in connection with FIGS. 14 to 16. The pusher 14c then resumes its axial movement and shifts the compressed group into a partly finished pack on the pack building conveyor 10. The leftward movement of the pusher 14d continues so that the thus filled pack is shifted onto the sealing conveyor 12. After reaching its leftmost axial position 14e, the pusher begins to move gradually back toward the fully retracted position in which it is located to the right of the group forming conveyor 6. The phantom-line curve 32 indicates in FIG. 2 the extent of axial movement of successive pushers 14 during a full revolution about the axis of the main shaft 24. The manner in which the pushers 30 shift packs 16 from the sealing conveyor 12 onto the conveyors 26 and 28 will be described later.

Figure 3:
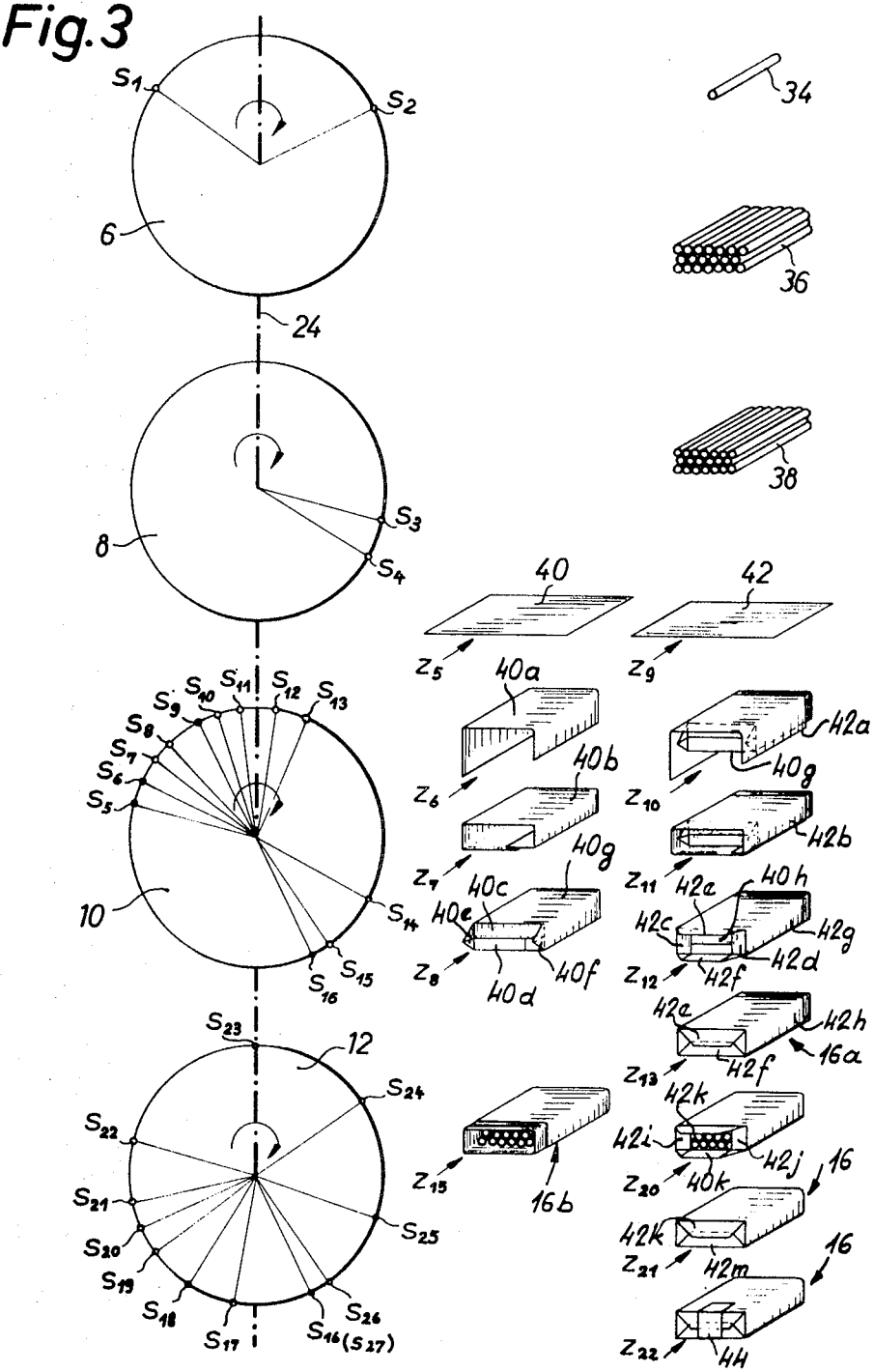
FIG. 3 is a somewhat distorted diagrammatic exploded perspective view of the four conveyors which are illustrated in FIG. 2 and further shows various stages in the formation and treatment of cigarette groups and various stages in conversion of two precut blanks into a finished cigarette pack.

FIG. 3 illustrates diagrammatically the sequence of steps in forming a finished pack 16. This pack is assumed to contain a block or group 36 of twenty cigarettes 34 in the customary array including two outer rows or layers of seven cigarettes each and a median row or layer of six cigarettes, see the upper right-hand part of FIG. 3. While a pocket or chamber of the group forming conveyor 6 rotates between the stations S1 and S2 shown at the top of FIG. 3, this chamber accumulates a group 36 of twenty cigarettes 34 in a manner to be described in connection with FIGS. 8 and 9 or 12 and 13. Such cigarettes are delivered into the chamber by the feed 4 of FIG. 1 which receives cigarettes from the main source 2. The group 36 is then shifted by the associated pusher 14 so that it moves from the chamber of the conveyor 6 into the registering tunnel of the compressing conveyor 8. Such shifting takes place between the stations S2 and S3. While the group 36 moves with the tunnel of the conveyor 8 and advances between the stations S3 and S4, its cigarettes 34 are subjected to the compressive action of condensing elements or jaws which will be described in connection with FIGS. 14 to 16 so that the group 36 is converted into a compressed or condensed group or block 38 which is ready for shifting into a partly finished pack shown at Z13 in FIG. 3.

While the conveyor 6 assembles a group 36 of twenty cigarettes 34 each, the pack building conveyor 10 receives a precut blank 40 of metallic foil which is delivered thereto at the station S5 shown in FIG. 3. This precut blank 40 is supplied to the conveyor 10 in a condition as shown at Z5, i.e., the blank 40 forms a flat body of rectangular outline. While advancing with the conveyor 10 and while moving between the stations S5 and S6, the blank 40 is partialy draped around a hollow prismatic pack supporting member or mandrel 206 which constitutes a receiving means for a group of articles and will be described in connection with FIG. 17 so that the blank 40 is transformed into a U-shaped body 40a which is shown at Z6 in FIG. 3. The formation of such U-shaped body 40a is completed at the station S6 and, while travelling between the stations S6 and S7, this U-shaped body 40a is subjected to further deforming treatment and is fully draped around the respective mandrel 206 so that it ultimately resembles a hose or sleeve 40b of rectangular cross-sectional outline (see the stage Z7 in FIG. 3). Two edge portions of the sleve 40b then overlap each other but both its longitudinal ends are still open. While travelling between the stations S7 and S8, the sleeve 40b is subjected to the action of suitable folding instrumentalities which provide its bottom end with two major flaps 40c, 40d as shown at Z8 while the two triangular minor flaps 40e, 40f still extend beyond the plane of the bent-over major flaps 40c, 40d. During travel between the stations S8 and S9, the thus deformed blank 40g is brought into contact with a precut rectangular blank 42 of paperboard or like material whose configuration is shown at Z9. The two blanks 40g, 42 then advance as a unit and, while moving with the conveyor 10 and while travelling between the stations S9 and S10, the blank 42 is partially draped around the deformed blank 40g so as to resemble a U-shaped body 42a which is shown at Z10. It is to be noted that portions of the blank 42 are coated with adhesive which will form a requisite number of seams to insure that the outer envelope formed by the blank 42 will remain closed. The blanks 40g, 42a then continue to advance with the conveyor 10 and, while travelling between the stations S10 and S11, the paperboard blank 42a is transformed into a hose or sleeve 42b which is shown at Z11. The overlapping edge portions of the sleeve 42b are caused to adhere to each other because the outer one of of such overlapping edge portions is coated with adhesive. The manner in which the blank 42 is coated with adhesive will be described in connection with FIG. 17. During travel between the stations S11 and S12, the two minor flaps 42c, 42d at the bottom end of the sleeve 42b are tucked between the two major flaps 42e, 42f so that the sleeve 42b then assumes a form 42g as shown at Z12. Such tucking of the minor flaps 42c, 42d at the bottom end of the blank 42b also results in folding of the minor flaps 40e, 40f at the bottom end of the blank 40g, i.e., the minor flaps 40e, 40f shown at Z8 are then caused to lie against the previously folded major flaps 40c, 40d so that the bottom end of the resulting blank 40h is completely closed. While travelling between the stations S12 and S13, the outer blank 42g is subjected to the action of suitable folding instrumentalities which fold the two major flaps 42e, 42f at the bottom end of this blank 42g so that the latter then assumes the shape 42h shown at Z13. The two major flaps 42e, 42f of the blank 42h are caused to adhere to each other because the overlapping major flap 42e is coated with adhesive. In other words, when the blanks 40h and 42h reach the stations S13 (while travelling with the conveyor 10), they form a partly finished pack 16a the top or head end of which is open and is thus ready to receive a condensed group or block 38. During travel between the stations S13 and S14, the pack 16a shown at Z13 is moved to an optimum position for reception of the condensed group 38, and such transfer of the group 38 takes place while the pack travels between the stations S14 and S15. It is to be noted here that, at the time it reaches the station S13, the mandrel 206 which carries the pack 16a shown at Z13 extends rad'ally of the conveyor 10 so that the closed bottom end of the pack 16a is located at the radially outermost end of the mandrel. During travel between the stations S13 and S14, the mandrel 206 moves to a position in which it extends axially of the conveyor 10 so that the open top end of the pack 16a faces toward the conveyor 8.

While travelling between the stations S15 and S16, the thus filled partly finished pack 16b (shown at Z15) is shifted by the pusher 14 to move from the conveyor 10 toward the sealing conveyor 12. This will account for dual showing of the station S16, namely, on the conveyors 10 and 12 of FIG. 3. Between the stations S16 and S17, the filled pack 16b is fully transferred onto the sealing conveyor 12. This pack 16b still resembles the one shown at Z15. While traveling with the conveyor 12, and while moving between the stations S17 and S18, the filled pack 16b is brought to an optimum position for sealing of its top end, i.e., the filled pack 16b was transferred onto the conveyor 12 while its open top end faced the conveyor 10 and this pack is then turned so that the open top end faces radially outwardly of the conveyor 12. At the station S19, the pack is ready to undergo further deformation which takes place between the stations S19 and S20. Such deformation results in tucking of the minor flaps on the blanks 40h and 42h as indicated at Z20 (only the minor flaps 42i, 42j of the blank 42h are visible) but the two major flaps of both blanks still extend away from the remainder of the pack 16b. In the position as shown at Z20, only the major flaps 40k, 42k can be seen. While advancing between the stations S20 and S21, the two major flaps of both blanks are folded over each other and the overlapping major flap 42k may be caused to adhere to the inner major flap 42m, provided that it has been coated with adhesive. This completes the formation of all necessary folds and tucks, not only on the inner blank 40 but also on the outer blank 42. The resulting finished pack 16 is shown at Z21. As a rule, the pack 16 will be provided with a suitable revenue stamp or label 44 which is applied over the major flaps 42k, 42m at the top end of the pack 16 while the pack advances with the sealing conveyor 12 and moves between the stations S21 and S22. The manner in which the revenue label 44 is applied over the top end of the outer blank of the pack 16 is shown at Z22. If the packaging machine includes only the components which are shown in FIG. 1 by solid lines, the finished packs 16 are ejected from the sealing conveyor 12 by the radially movable plungers 18 which deliver such packs into the range of the transfer conveyor 20 so that the latter may advance the packs onto the take-off conveyor 22. Such ejection of packs 16 (each with a revenue label 44 applied over its top end) would take place between the stations S22 and S23 of FIG. 3.

Figure 4:
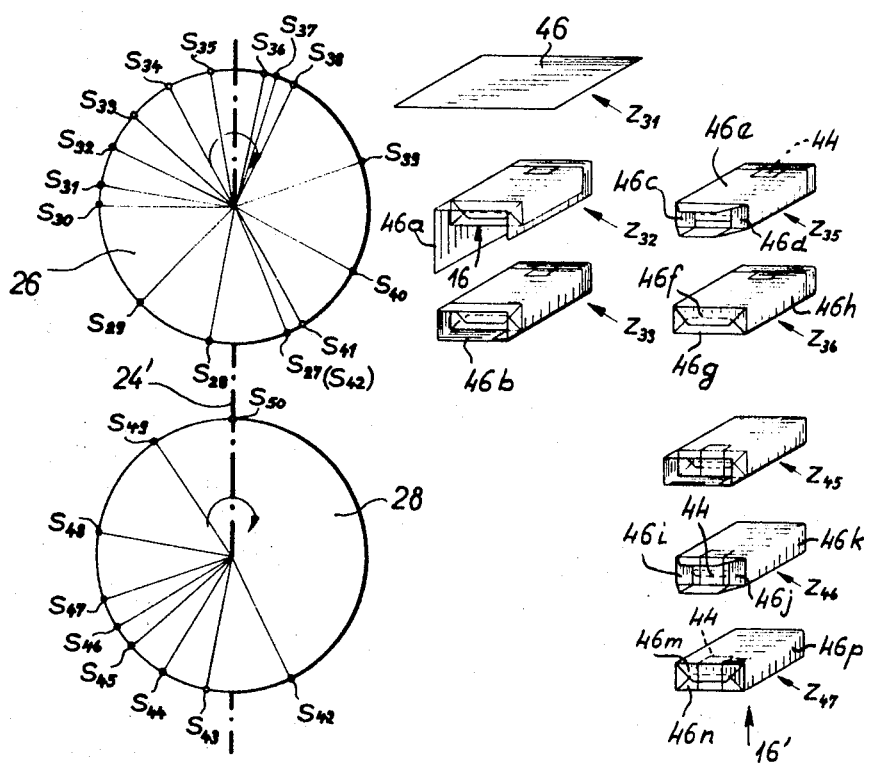
FIG. 4 is a similar exploded perspective view of the two endless conveyors which are indicated in FIG. 1 by phantom lines, further showing various stages in the conversion of a third precut blank into an envelope for a finished cigarette pack.

However, if the packaging machine further includes the endless conveyors 26 and 28 of FIG. 1, the packs 16 are not ejected into the range of the transfer conveyor 20 but are subjected to further treatment in a manner as shown in FIG. 4. As described hereinbefore, the conveyors 26, 28 are necessary if the packs 16 are to be provided with outer layers or envelopes consisting of transparent plastic material. Instead of being ejected not later than at the station S24 of the sealing conveyor 12, the pack 16 (with a revenue label 44 applied over its top end) advances toward and beyond the station S24 (see FIG. 3) and, while moving between the stations S24 and S25, this pack is turned from a position in which the revenue label extends radially outwardly to a position in which the label 44 faces toward the conveyor 10, i.e., in which the pack 16 assumes a position wherein the axes of the cigarettes 34 contained therein extend in parallelism with the shafts 24 and 24'. While still travelling with the conveyor 12, the thus turned pack 16 moves between the stations S26 and S27 (FIG. 3) and is shifted axially of the conveyor 12 (by means of the aligned pusher 30 shown in FIG. 1) so that it is transferred toward the conveyor 26. Such transfer is completed between the stations S27 and S28 (see FIG. 4). While travelling with the conveyor 26, and while moving between the stations S29 and S30, the pack 16 is brought to an optimum position for application of a transparent plastic blank 46 (shown at Z31 in FIG. 4) which may consist of cellophane. Such positioning involves turning of the pack 16 from an axial to a radial position with reference to the conveyor 26. The blank 46 is introduced at the station S31. Between the stations S31 and S32, the blank 46 is deformed into a substantially U-shaped body 46a which is shown at Z32 and, while moving between the stations S32 and S33, the U-shaped body 46a is draped around the pack 16 so that it forms a sleeve 46b which is shown at Z33. The overlapping edge portions of the sleeve 46b are welded or otherwise sealingly secured to each other, and such welding takes place while the sleeve 46b travels from the station S33, through the stations S34, S35, S36, and on to the station S37. During such welding, and while the sleeve 46b travels between the stations S34 and S35, the sleeve is subjected to the action of suitable tucking instrumentalities which tuck in the two minor flaps 46c, 46d at the bottom end of the pack 16. This is shown at Z35. While advancing between the stations S35 and S36, the resulting blank 46e is treated by folding instrumentalities which fold the major flaps 46f, 46g at the bottom end of the pack 16 so that the blank 46e then assumes a form 46h as shown at Z36. The thus folded major flaps 46f, 46g at the bottom end of the pack 16 are welded to each other while the blank 46h travels between the stations S38 and S39. This completes the formation of the transparent outer layer, excepting for the closing and sealing of its top end. The top end is sealed on the conveyor 28 and, therefore, the pack 16 (with the blank 46h nearly completely applied therearound) is then turned to assume an optimum position for transfer onto the conveyor 28. Such turning again involves movement from a radial to an axial position which takes place while the three blanks travel between the stations S39 and S40. In the zone between the stations S41 and S42, the pack begins to move toward the conveyor 28, and such transfer is completed between the stations S42 and S43. While moving with the conveyor 28, and while travelling between the stations S44 and S45, the pack 16 is turned to an optimum position for sealing of the top end of the blank 46h, and such turning again involves movement from an axial position to a radial position. This radial position is shown at Z45. During travel between the stations S45 and S46, the blank 46h is subjected to the action of tucking instrumentalities which tuck in the two minor flaps 46i, 46j at the top end of the pack (see Z46 in FIG. 4). Finally, and while moving between the stations S46 and S47, the resulting blank 46k is treated by folding means which fold the two major flaps at the top end of the pack so that the outer layer or envelope of the pack is completed and assumes a shape as shown at Z47. Between the stations S48 and S49, the major flaps 46m, 46n at the top end of the blank 46p are welded to each other. The resulting finished pack 16' is then engaged by the corresponding plunger 18' and is ejected radially outwardly to move into the range of the transfer conveyor 20' which advances the pack 16' onto the take-off conveyor 22'. The ejection of the pack 16' is completed at the station S50.

Referring now to FIG. 5, there is shown in greater detail the construction of the endless conveyors 6, 7, 8 and 10, of the transfer members or pushers 14, of the main source 2 and feed 4. The packaging machine which embodies the components shown in FIG. 5 can be utilized to make packs 16, i.e., packs of the type comprising an inner layer or envelope of tinfoil or the like and an outer layer or envelope of paperboard. The main source 2 includes the aforementioned conveyor 64 for trays 66 and the magazine or hopper 60. The feed 4 includes twenty substantially vertical channels 68 (best shown in FIG. 8), one for each cigarette 34 of a group 36. The channels 68 are adjacent to the periphery of the conveyor 6 and each such channel contains a pile or stack of cigarettes 34 received from the hopper 60. The upper or intake end of each channel 68 is adjacent to one of a series of oscillatable channel filling rollers 70 and the lower or discharge end of each channel 68 is adjacent to one of a series of driven feeding rollers 72. The exact construction and mode of operation of the feeding rollers 72 will be described in connection with FIG. 10. The shaft 24 for the conveyors 6, 8, 10 and 12 is a hollow cylindrical body whose axis is horizontal and which is fixedly mounted in the frame 50 of the packaging machine. The conveyors 6 and 8 are coupled to each other by an axially extending key or wedge 76 which is recessed into a bearing sleeve 78 mounted on antifriction bearings 80 which surround the main shaft 24. A second key or wedge 82 connects the conveyors 10, 12 to each other and to a second bearing sleeve 84 which is mounted on antifriction bearings 86 surrounding the shaft 24. The drive for the conveyors 6, 8, 10 and 12 comprises an electric motor 88 whose output shaft carries a pinion 90 meshing with a ring gear 92 secured to the hub 146a of the group forming conveyor 6. The hub 146a transmits motion to the key 76 which in turn drives the conveyor 8 and the sleeve 78. The conveyor 8 carries bolts (to be described in connection with FIGS. 6 and 7) which are adjacent to its periphery and serve as a means for coupling this conveyor with the conveyor 10. The latter drives the key 82 and hence the conveyor 12 and sleeve 84. In the illustrated embodiment, the conveyors 8 and 10 are coupled to each other by three equidistant bolts 94 (see FIGS. 6 and 7) each of which extends into an eye 96 of the conveyor 10 and into an eye 98 of the conveyor 8.

As described hereinbefore, the pushers 14 orbit with the conveyors 6, 8, 10, 12 and are arranged to perform strokes in parallelism with the axis of the main shaft 24 in order to transfer groups 36, 38 and to transfer partly finished filled packs 16b in a direction from the right to the left, as viewed in FIG. 5. There is one pusher 14 for each chamber of the conveyor 6 and each such pusher registers with the respective chamber. The pushers 14 are supported by an annular bracket 102 which carries pairs of guide rods 104, one pair for each pusher. The guide rods 104 are parallel with the main shaft 24. The right-hand end portion of each pusher 14 carries a roller follower 106 which extends into the annular groove of a fixed operating cam 108. In developed view, the outline of the groove in the operating cam 108 resembles the curve 32 of FIG. 2 so that the pushers 14 are automatically compelled to perform strokes of requisite length as soon as the bracket 102 is set in rotary motion. The operating cam 108 is stationary and is fixed to or integral with an annular carrier 110 which is fixedly mounted on the main shaft 24 to the right of the motor 88. A second carrier 112 is mounted on the main shaft 24 between the carrier 110 and bearing sleeve 78 to support the bracket or platform 116 of the motor 88. The carrier 112 is fixedly secured to the main shaft 24 and is rigid with an operating cam 114 which is adjacent to the right-hand side of the conveyor 6 and defines an annular groove 188 (FIG. 12) for a set of roller followers 186 to be described in connection with FIGS. 12 and 13.

The sleeves 78 and 84 are slightly spaced from each other so that they may accommodate therebetween a third annular carrier 118 which extends radially outwardly between the conveyors 8 and 10 and is rigid with five annular cams 120, 122, 124, 126 and 127. The purpose of these cams (each of which is formed with a specially configurated annular cam groove) will be described hereinafter. The shaft 24 further supports a fourth carrier 128 which is adjacent to the left-hand side of the conveyor 12 and is rigid with two annular cams 130, 132 each having an annular cam groove. The carrier 128 is adjacent to the right-hand side of a fifth carrier 134 which is also fixed to the main shaft 24 and is rigid with an annular operating cam 136 whose annular cam groove receives a set of roller followers 138 for pushers 140 which are reciprocable in the axial direction of the shaft 24 and serve as back supports to prevent undesirable deformation or destruction of partly finished packs during transfer from the conveyor 10 onto the conveyor 12. In the following part of this description, the pushers 140 will be called back supports to differentiate them from the pushers 14 or 30. The back supports 140 are carried by the sealing conveyor 12 and rotate therewith whereby the followers 138 travel in the groove of the fixed operating cam 136 and cause the back supports to perform strokes of requisite length, all such strokes being carried out in parallelism with the axis of the main shaft 24. Each back support 140 registers with one of the pushers 14. As shown in FIG. 5, the transfer conveyor 20 is outwardly adjacent to the sealing conveyor 12 and entrains finished packs 16 which are ejected by plungers 18 to transfer such packs onto the take-off conveyor 22.

Figure 8:
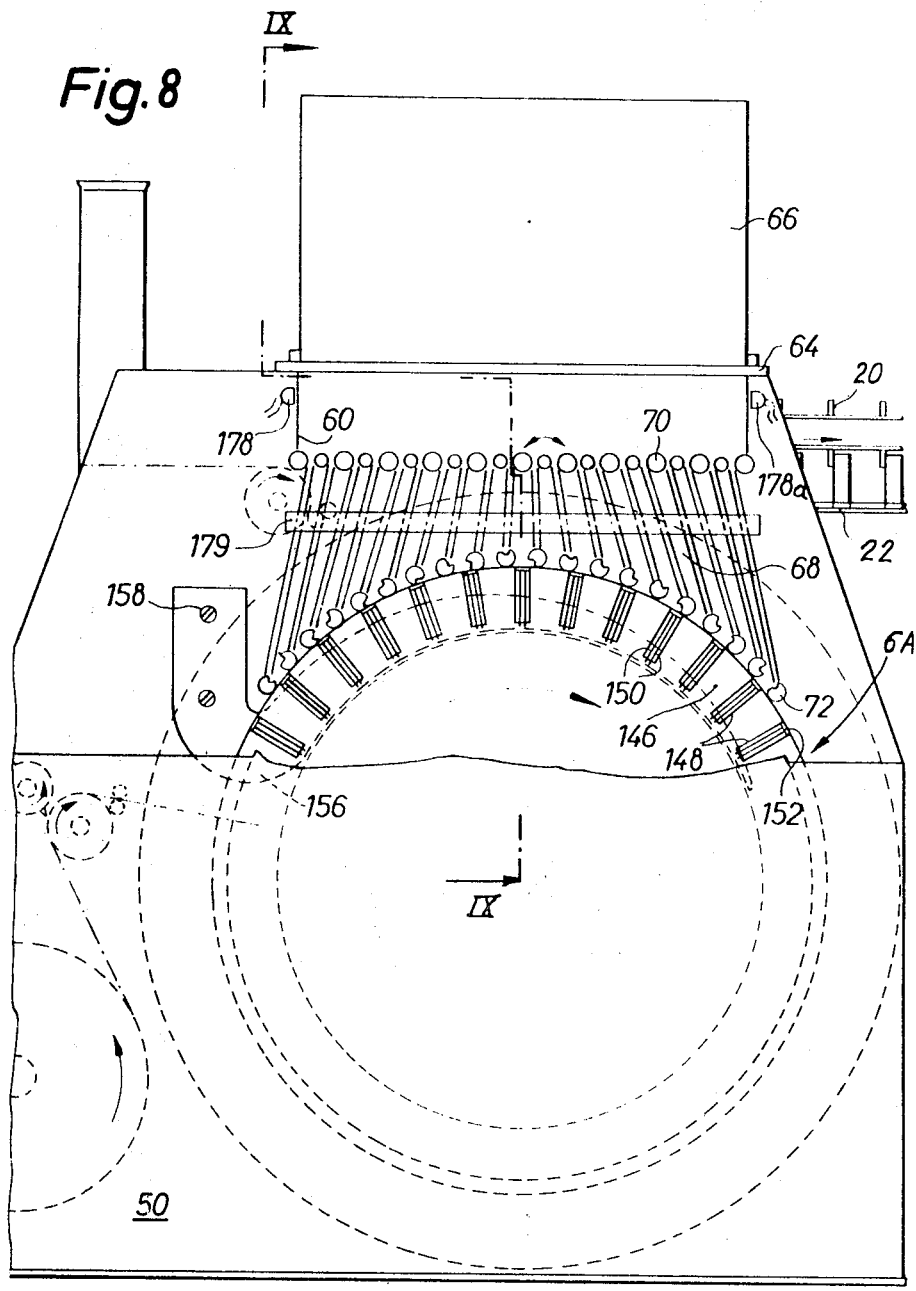
FIG. 8 is an end elevational view of a packaging machine substantially as seen from the right-hand side of FIG. 5, with a portion of the frame broken away to reveal certain details of the main source of cigarettes and of the feed which supplies cigarettes to the chambers of a slightly modified group forming conveyor.
Figure 9:
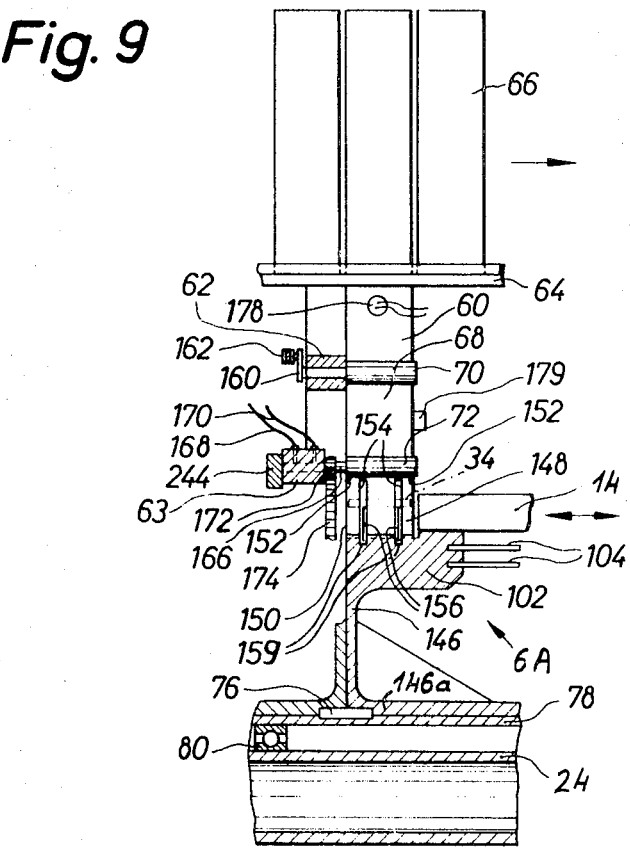
FIG. 9 is a fragmentary axial sectional view of the modified group forming conveyor, through the feed and through the main source, substantially as seen in the direction of arrows from the line IX—IX of FIG. 8.
Figure 10:
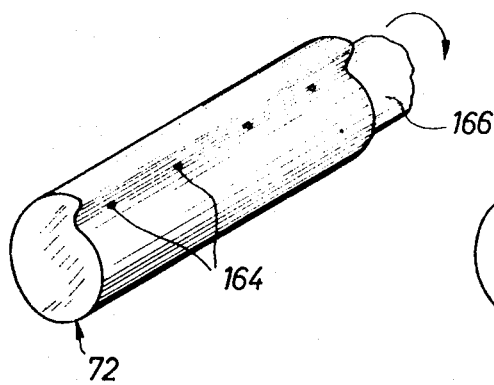
FIG. 10 is an enlarged perspective view of a feeding roller which may be utilized in the feed of the packaging machine shown in FIG. 5 or 8.

FIGS. 8 and 9 illustrate in greater detail the construction of a group forming conveyor 6A which is somewhat different from the conveyor 6 of FIG. 5. In addition to the aforementioned hub 146a, the conveyor 6A comprises a turret 146 having a substantially disk-shaped web and an annular rim whose width, as seen in the axial direction of the main shaft 24, exceeds only slightly the length of a cigarette 34. The aforementioned receiving means or chambers of the group forming conveyor are provided in the peripheral surface of the rim of the turret 146 and are designated by numerals 148. Each of these chambers 148 is dimensioned in such a way that it can accommodate two outer rows or layers of seven superimposed cigarettes each and a median row or layer of six superimposed cigarettes. Such rows or layers are disposed in planes extending substantially radially of the turret 146. Furthermore, each chamber 148 accommodates two radially extending partitions 150 which are secured to pairs of strip-shaped supporting elements 152 extending in the circumferential direction of the rim of the turret 146. Each pair of partitions 150 divides the interior of the respective chamber 148 into three parallel compartments including two outer compartments each adapted to accommodate a row or layer of seven cigarettes and a median compartment which can receive a row or layer of six cigarettes. The cigarettes of the layer in the median compartment are staggered with reference to the cigarettes of the layers in the two outer compartments in a manner well known to cigarette smokers and readily discernible on opening of a full cigarette pack. Each partition 150 is provided with two slots 154 (see FIG. 9) for two specially configurated guide rails 156 forming part of a lowering means. As clearly shown in FIG. 9, the guide rails 156 support the cigarettes 34 in the region of their ends. The partitions 150 facilitate the assembly of groups 36 wherein the cigarettes are arrayed with utmost accuracy despite the fact that the cigarettes of adjoining layers are staggered with reference to each other.

The guide rails 156 resemble sickles (see FIG. 8) and extend in the zone below the discharge ends of the channels 68. Their left-hand end portions (as viewed in FIG. 8) extend outwardly from the conveyor 6A and are affixed to the frame 50 by screws 158 or similar fasteners. These guide rails extend into two circumferential grooves 159 of the rim on the turret 146 and their height, as seen in the radial direction of the conveyor 6A, decreases proportionally with the extent to which the chambers 148 advancing below the feeding rollers 72 are being filled with cigarettes 34. In FIG. 8, the turret 146 is assumed to rotate continuously in a clockwise direction as indicated by the arrow. The discharge ends of the channels 68 are disposed along an arc which is concentric with the conveyor 6A and is adjacent to the periphery of the turret 146. Each discharge end is located at the same distance from the periphery of the turret. The channel filling rollers 70 are rotatable in a supporting member 62 which is radially outwardly adjacent to one axial end of the turret 146, see FIG. 9. The supporting member 62 is mounted on and is adjacent to outlets of the hopper 60. The drive which oscillates the rollers 70 comprises levers 160 each of which is connected to one of the rollers 70 and receives motion from a drive shaft 162. The feeding rollers 72 are journalled in a segment-shaped supporting member 63 which is also carried by the hopper 60. The peripheral surface of each feeding roller 72 is of helical outline as clearly shown in FIG. 10. That region of such helical peripheral surface which serves to deliver a cigarette 34 into the adjoining chamber 148 of the turret 146 forms an elongated recess or flute and is provided with a row of ducts 164 which communicates with the axial bore of a hollow shaft 166. The bore of the shaft 166 is connected to a compressed air line 168 and thereupon to a suction line 170 during each revolution of the respective feeding roller 72 so that the ducts 164 alternately suck air and discharge jets of compressed air. When a feeding roller 72 is to withdraw a cigarette 34 from the respective channel 68, its ducts 164 are connected with the suction line 170 to that the cigarette is held in the axially extending recess of the feeding roller 72. When the ducts 164 face downwardly toward the momentarily aligned chamber 148, they are connected with the line 168 so that they discharge blasts of compressed air which propel the cigarette into the chamber. The shaft 166 of each feeding roller 72 carries a pinion 172 which meshes with a ring gear 174 affixed to the compressing conveyor 8 so that the feeding rollers 72 are driven at a predetermined speed in synchronism with the group forming conveyor 6A.

The groups 36 of cigarettes 34 are delivered onto the upper (edge) surfaces of the guide rails 156 and the distance between such upper surfaces and successive feeding rollers 72 increases at the same rate at which the groups 36 grow so that each cigarette 34 descends from a higher level to a lower level but through the same distance. This insures that the cigarettes are treated gently and that particles of tobacco cannot escape through the open ends of their paper wrappers. Such tobacco particles could contaminate the packaging machine which could result in lengthy interruptions. Also, many smokers dislike cigarettes whose ends are too soft.

Figure 11:
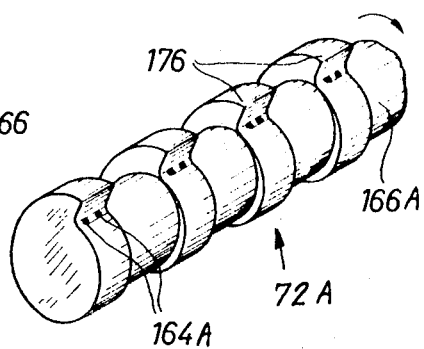
FIG. 11 is a similar perspective view of a modified feeding roller.

FIG. 11 illustrates a modified feeding roller 72A. The shaft 166A of this feeding roller carries a set of axially adjustable disks 176 each of which is formed with a cigarette-receiving recess and with one or more ducts 164A. The peripheral surface of each disk 176 again resembles a spiral and the ducts 164A form a row each duct of which is connected with the suction line 170 when the feeding roller 72A is to transfer a cigarette from the discharge end or outlet of the corresponding channel 68 to a position for admission into the adjoining chamber 148. During actual discharge, the ducts 164A are connected with the compressed air line 168 in the same way as described in connection with FIG. 10.

The hopper 60 is preferably provided with a control unit which can supervise the level of the cigarettes 34 therein and is arranged to send appropriate signals whenever the level drops below a predetermined height or whenever the supply of cigarettes in the hopper 60 exceeds a permissible value. The control unit comprises a source of light 178a and a photoelectric cell 178 which produces signals when the supply of cigarettes in the hopper 60 shrinks to such an extent that the beam of light issuing from the source 178a actually reaches the photosensitive element. It is equally clear that the control unit may comprise a mechanical detector which rests on the top layer of cigarettes in the hopper 60 and initiates the generation of appropriate signals whenever the supply of cigarettes descends below or rises above a predetermined range. The control unit including the cell 178 and source 178a regulates the operation of the conveyor 64 and insures that a fresh tray 66 discharges its contents whenever the supply of cigarettes in the hopper 60 is depleted. Thus, a fresh tray 66 will be caused to move to discharging position whenever the light beam issuing from the source 178a is allowed to reach the photosensitive element of the cell 178.

The hopper 60 is further provided with a suitable testing device 179 which can test the cigarettes 34 for the presence or absence of defects (such as leaks in the wrapper and/or unsatisfactory density of the tobacco filler rods). The exact construction of the testing device 179 forms no part of this invention and it suffices to say that the testing device is preferably capable of producing impulses resulting in ejection or segregation of defective cigarettes before a defective cigarette can reach a channel 68 but definitely before a defective cigarette reaches a chamber 148. The testing device 179 can examine the cigarettes individually or in groups and may be disposed above or at a level below the rollers 70 to cooperate with a pneumatic or otherwise constructed ejector which insures that a defective cigarette is disposed of before it can enter a chamber 148 on the group forming conveyor 6A. In the embodiment of FIGS. 8 and 9, the testing device is located at a level between the rollers 70 and 72.

Figure 12:
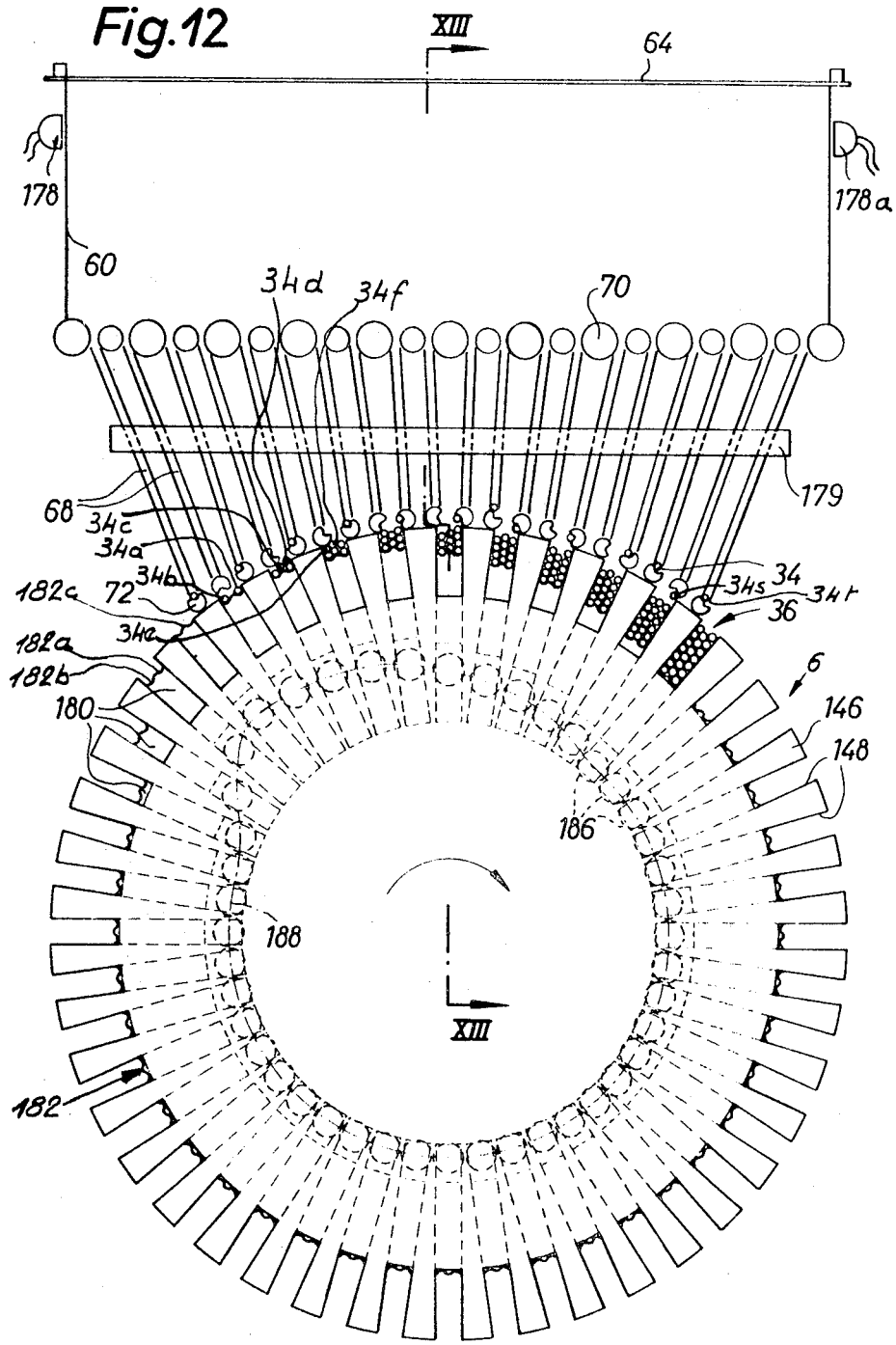
FIG. 12 is an enlarged end elevational view of the group forming conveyor in the packaging machine of FIG. 5, further showing the manner in which the component parts of the feed assemble successive groups of properly arrayed cigarettes in the chambers of the turret which forms part of the group forming conveyor.
Figure 13:
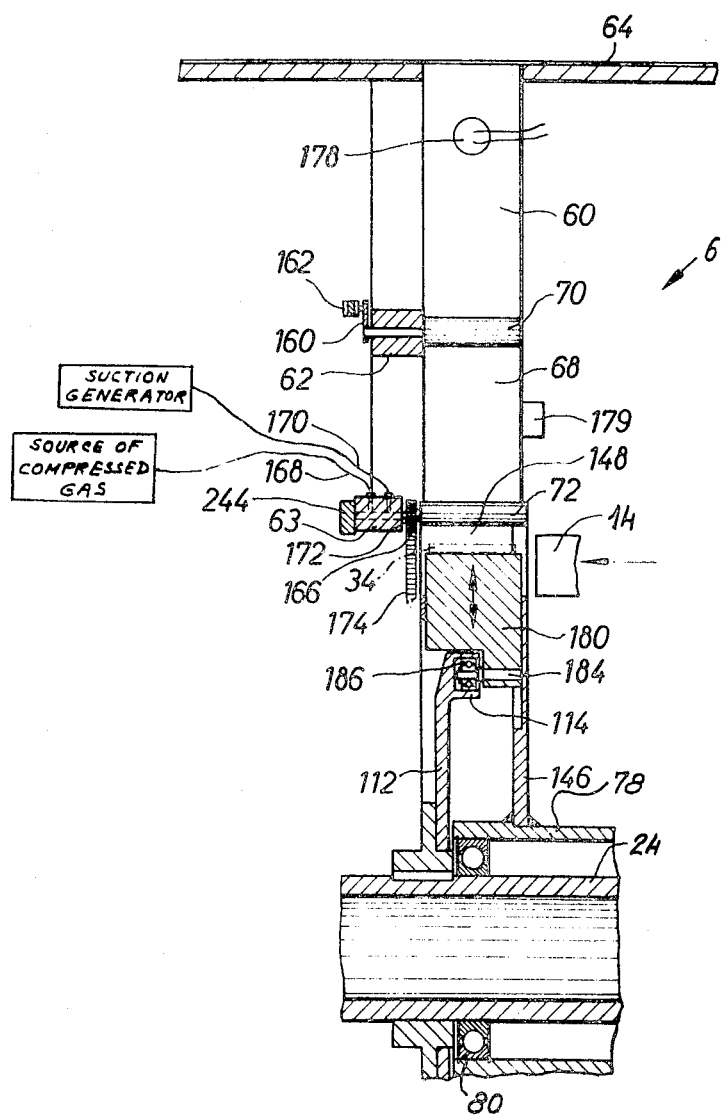
FIG. 13 is a fragmentary axial sectional view of the group forming conveyor, substantially as seen in the direction of arrows from the line XIII—XIII of FIG. 12.

FIGS. 12 and 13 illustrate in greater detail the group forming conveyor 6 of FIGS. 1, 2, 3 and 5. All such component parts of this conveyor 6 which are identical with the corresponding parts of the conveyor 6A of FIGS. 8 and 9 are denoted by similar reference numerals. The main difference between the conveyors 6 and 6A is that the conveyor 6 does not comprise a lowering means which utilizes fixed guide rails 156. These guide rails are replaced by radially reciprocable bottom walls 180 having suitably configurated outer surfaces 182 which support the three innermost cigarettes 34a–34c of each group 36. The inner end portion of each bottom wall 180 carries a pin 184 for a roller follower 186 which extends into the schematically indicated annular groove 188 of the aforementioned operating cam 114 on the carrier 112. The configuration of the groove 188 is such that, while travelling below the discharge ends of successive channels 68, the bottom walls 180 descend gradually by moving radially toward the axis of the turret 146 at a rate commensurate with the extent to which the respective receiving means or chambers 148 are filled with cigarettes. The turret 146 is driven in a clockwise direction, as viewed in FIG. 12, and the feeding rollers 72 are driven in such a way that the leftmost (trailing) roller 72 deposits a leading cigarette 34a in the leading groove 182a of the outer surface 182 therebelow, that the second feeding roller 72 deposits a trailing cigarette 34b in the trailing groove 182b of the surface 182 therebelow, that the third roller 72 deposits a cigarette 34c on the crest 182c between the grooves 182a, 182b, that the fourth roller 72 deposits a cigarette 34d above the leading cigarette 34a, that the fifth roller 72 deposits a cigarette 34e above the trailing cigarette 34b, that the sixth roller 72 deposits a cigarette 34f above the median cigarette 34c, and so forth until the respective chamber 148 contains a group 36 of twenty properly arrayed parallel cigarettes. The partitions 150 are omitted. The rightmost roller 72 is the leading roller, as seen in the direction in which the turret 146 rotates, and this leading roller delivers to each chamber 148 the last cigarette 34 of the respective group 36. The cigarettes 34 in each group 36 are arranged in quincunx formation.

The feed of FIGS. 8–9 or 12–13 may be readily converted for assembling of different types of groups. For example, one or more feeding rollers 72 may be arrested so that a fully assembled group will contain less than twenty cigarettes 34. Also, one or more feeding rollers 72 may be constructed to deliver two or more cigarettes at a time. Still further, the number of channels 68 and feeding rollers 72 may be reduced or increased, depending on the desired number of cigarettes in a fully assembled group. It is equally clear that the drive 172, 174 which rotates the feeding rollers 72 in synchronism with movement of the conveyor 6 or 6A may be modified so that the articles in successively formed groups will be arrayed in a different way. For example, each layer of a group may contain the same number of cigarettes or a central layer of say seven cigarettes may be flanked by two outer layers of six cigarettes each. Also, the feeding rollers 72 may be arranged to assemble groups each of which contains ten cigarettes 34 in two parallel layers of five cigarettes each, or groups containing only one layer of four cigarettes each.

It was found that the feed of FIGS. 8–9 or 12–13 is particularly advantageous for assembling of groups which contain relatively large numbers of cigarettes 34. This is due to the fact that each feeding roller 72 must transfer only one cigarette at a time so that their rotational speed need not be excessve which insures that the cigarettes are not damaged during delivery to the conveyor 6 or 6A. Also, such mode of assembling the groups 36 insures that the groups can be assembled at a very high speed despite the fact that the cigarettes supplied into the channels 68 advance by gravity feed.

Since the ducts 164 or 164A of the feeding rollers 72 or 72A actually suck cigarettes from the respective channels 68 and propel the thus withdrawn cigarettes into the adjoining chambers 148 of the conveyor 6 or 6A, they also serve as a means for preventing jamming of cigarettes in the channels 68 and/or in the chambers 148. The movement of cigarettes through the channels 68 is very smooth in contrast to the movement of cigarettes in the feeds of presently known packaging machines.

Figure 14:
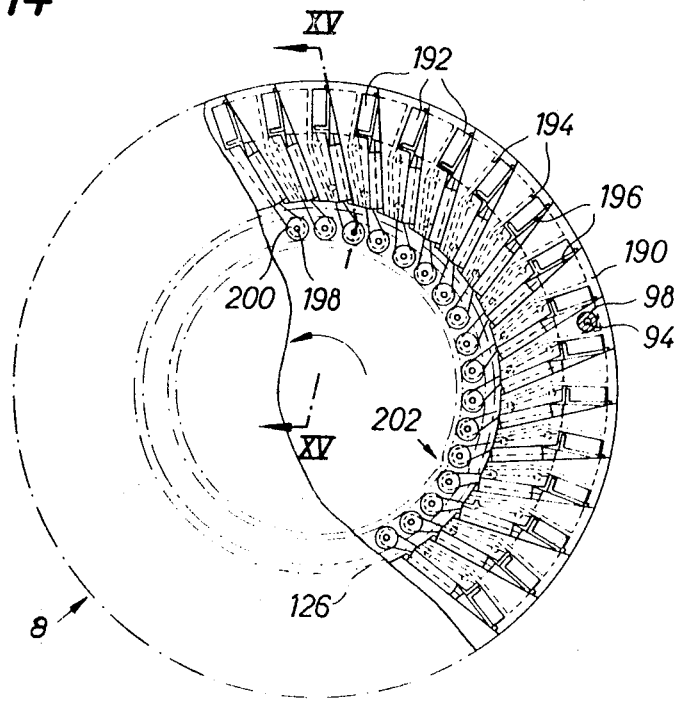
FIG. 14 is an end elevational view of a compressing or compacting conveyor which is utilized in the packaging machine of FIG. 5, certain parts of this conveyor being broken away to reveal the tunnels in which the groups of cigarettes are compacted or condensed by means of fixed and movable compressing jaws.
Figure 15:
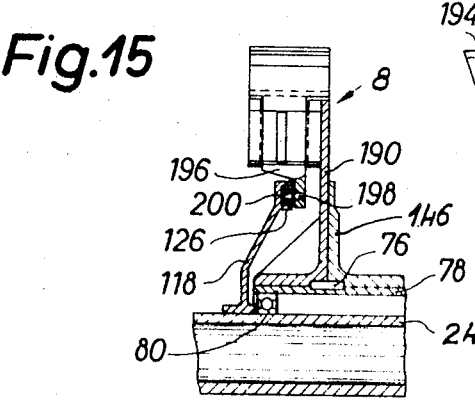
FIG. 15 is a fragmentary substantially axial sectional view of the compressing conveyor as seen in the direction of arrows from the line XV—XV of FIG. 14.
Figure 16:
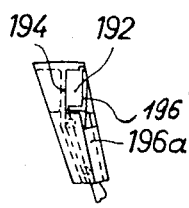
FIG. 16 illustrates on a larger scale a detail of the structure shown in FIG. 14.

The construction of the compressing or condensing conveyor 8 is shown in FIGS. 14 to 16. This conveyor also comprises a turret 190 which is coupled with the turret 146 of the conveyor 6 and with the bearing sleeve 78 by means of the wedge or key 76. As explained in connection with FIG. 5, the sleeve 78 rotates around antifriction bearings 80 which are mounted on the main shaft 24. The rim of the turret 190 is formed with an annulus of group receiving and condensing chambers or tunnels 192 each of which registers with one of the chambers 148 in the turret 146. Two sides of each tunnel 192 are bounded by an L-shaped compressing or compacting member or jaw 194 which is affixed to or integral with the turret 190, and two additional sides of each tunnel 192 are bounded by a radially movable L-shaped compressing or condensing member or jaw 196. The means for reciprocating the jaws 196 comprises substantially radially inwardly extending arms 196a the innermost ends of which carry shafts 198 for roller followers 200. These followers extend into the endless groove of the fixed cam 126 (see also FIG. 5) which is mounted on or integral with the carrier 118. While travelling along a condensing or compressing station 202 (see FIG. 14), the followers 200 are caused to engage a fixed cam lobe which causes the respective compressing jaws 196 to move radially outwardly for a relatively short interval of time and to thus compact a group 36 of cigarettes 34 so that the group 36 is converted into a group 38 (see FIG. 3). The wedging action of jaws 194, 196 can be readily understood by looking at FIG. 16 and by considering that, while its follower 200 engages the lobe of the cam 126 (station 202), the jaw 196 moves upwardly to compact the group 36 which fills the tunnel 192.

The compacting or condensing step is of particular advantage when the cigarettes are to be accommodated in so-called soft packs. This condensing step enables the pack building and sealing conveyors 10, 12 to form each pack 16 with flat surfaces and with sharply defined edges.

The exact construction of the pack building conveyor 10 is illustrated in FIGS. 17 to 19. This conveyor again comprises a wheel- or disk-shaped turret 204 which is coupled to the bearing sleeve 84 and conveyor 12 by the aforementioned wedge or key 82 (see also FIG. 5). The sleeve 84 is mounted on bearings 86. The rim of the turret 204 carries a set of equidistant hollow prismatic pack supporting members or mandrels 206 each of which constitutes a receiving means for a group of articles and each of which is turnable on a shaft 208. One open end of each mandrel 206 can be brought into accurate registry with a tunnel 192. The internal space of each mandrel 206 is dimensioned in such a way that it can readily receive a condensed group 38 of twenty cigarettes 34. Each shaft 208 is rotatable in two brackets or lugs 209 of the turret 204 and each mandrel 206 is rigid with the respective shaft 208. Each shaft 208 is further connected with a crank arm 210 serving as a means for turning the respective mandrel 206 from a position axially to a position radially of the turret 204, or vice versa. Each crank arm 210 is articulately connected with a link 212, and each link 212 is articulately connected with a push rod 214. The push rods 214 are reciprocable in guide blocks 215 of the turret 204 and their innermost portions carry shafts 216 for roller followers 218 which extend into the endless groove of the fixed cam 124 on the carrier 118. The configuration of the groove in the cam 124 is such that, while the turret 204 rotates, the mandrels 206 are automatically moved from axial positons to radial positions and vice versa in predetermined angular positions of the conveyor 10.

Each mandrel 206 cooperates with a draping or deforming member 220, with two clamping or deforming members 222, 224, and with a radially reciprocable rim 226. With reference to FIGS. 17 and 18, the radially innermost portion 220a of each draping member 220 resembles an L-shaped body or a two-armed lever and is mounted on a shaft 228 which is journalled in a bearing member 230 provided therefore in the turret 204. Each lever 220a further carries a shaft 234 for a roller follower 232. All of the followers 232 extend into the endless groove of the cam 122 on the carrier 118 so that the cam 122 controls movements of draping members 220 with reference to the associated mandrels 206.

The clamping members 222 are rockable on pivot pins 235 carried by the turret 204 and their inner end portions carry shafts 236 for roller followers 238. All of the followers 238 extend into the endless groove of the fixed cam 120. The clamping members 224 are rockable on pivot pins 240 of the turret 204 and carry roller followers 242 which can engage a fixed cam 244 provided on the supporting member 63 of the hopper 60. Each clamping member 224 resembles a bell crank lever.

The rams 226 are movable radially of the turret 204 and their radially innermost portions carry shafts 246 for roller followers 248. The followers 248 of all rams 226 extend into the groove of the fixed cam 127.

In addition to the heretofore described pack building or blank deforming components of the conveyor 10, FIG. 17 illustrates several further pack building or blank deforming components which are adjacent to the path of the mandrels 206 and which cooperate therewith and with the members 220, 222, 224, 226 to form partly finished packs 16a of the type shown in FIG. 3. These further pack building or blank deforming components include a device for forming and feeding tinfoil blanks 40 which comprises a reel 250 containing a convoluted web 252 of tinfoil, a suction conveyor drum 254 which cooperates with a revolving knife 256 to sever the leading end of the web 252 at regular intervals and to thus form the blanks 40. Driven guide rolls 258 advance successively formed blanks 40 from the suction drum 254 onto a pair of fixed guide bars 260 which are located at the opposite sides of the path of successive mandrels 206. Thus, as a mandrel 206 enters the space between the guide bars 260, its front panel automatically entrains the blank 40 so that such blank extends between the mandrel 206 and the corresponding draping member 220, the latter being then slightly spaced from the mandrel to allow for entry of the blank 40.

The guide bars 260 are followed by two drapers or sleeve formers 262 which are moved in synchronism with the mandrels 206. The draping members 220 convert the blanks 40 into U-shaped bodies 40a (see FIG. 3) and the drapers 262 convert such U-shaped bodies 40a into sleeves 40b. The drapers 262 are followed by a folding member 266 which is operated by an eccentric drive 264 and serves to fold the major flaps 40d (see FIG. 3). The major flaps 40c are folded by a stationary folding member 262 which follows the movable folding member 266 and cooperates with successive mandrels 206 to convert successive sleeves 40b into deformed blanks 40g (see FIG. 3).

The folding member 268 is followed by a device for feeding paperboard blanks 42. This device comprises a chute 270 or a similar source of uncoated blanks 42, a feeder (not shown) which removes successive blanks 42 from the bottom zone of the chute 270 and feeds them onto a paster PA of known design which includes a paste-containing tank and suitable roller-shaped applicators 272 serving to apply adhesive to selected portions of successive blanks 42. A suction conveyor drum 274 receives adhesive-coated blanks 42 from the applicators 272. Advancing rolls 276 remove blanks 42 from the suction conveyor drum 274 and feed them onto a pair of guide bars 278 positioned in the same way as the guide bars 260 and serving to place successive adhesive-coated blanks 42 into the path of mandrels 206. The feed of blanks 42 is timed in such a way that, when a blank is transferred onto the guide bars 278, the respective mandrel 206 is located behind but the corresponding draping member 220 is located in front of the blank. The draping member 220 is then caused to move toward the respective mandrel 206 and to convert the blank 42 into a U-shaped body 42a (see FIG. 3).

The guide bars 278 are followed by two drapers or sleeve formers 280 which are movable in synchronism with the mandrels 206 and serve to convert successive U-shaped bodies 42a into sleeves 42b. The drapers 280 are followed by two rotary cam-shaped tucking members 282 (only one of these tucking members is shown at the top of FIG. 17) whose purpose is to tuck in the minor flaps 42c, 42d and to thus transform successive sleeves 42b into deformed blanks 42g. Of course, the members 282 simultaneously tuck in the minor flaps 40e, 40f of the blanks 40g so that such blanks are converted into blanks 40h (see FIG. 3). The axes of the tucking member 282 are inclined with reference to the axis of the turret 204 and their lobes are capable of completing a tucking operation while a mandrel 206 advances therebelow so that the turret 204 can travel continuously.

The tucking members 282 are followed by a movable folding member 284 which is operated by an eccentric drive 286 in synchronism with the movement of mandrels 206 and serves to fold the major flaps 42f (see FIG. 3). Finally, the mandrels 206 advance seriatim along a fixed folding member 288 whose function is to fold the major flaps 42e and to thus convert the blanks 42g into blanks 42h. The folding member 288 is long enough to insure that adhesive applied to successive major flaps 42e can set and seals the bottom ends of successive partly finished packs 16a. If desired, the folding member 288 may be heated by electric current or by a circulating heating medium.

Figure 20:
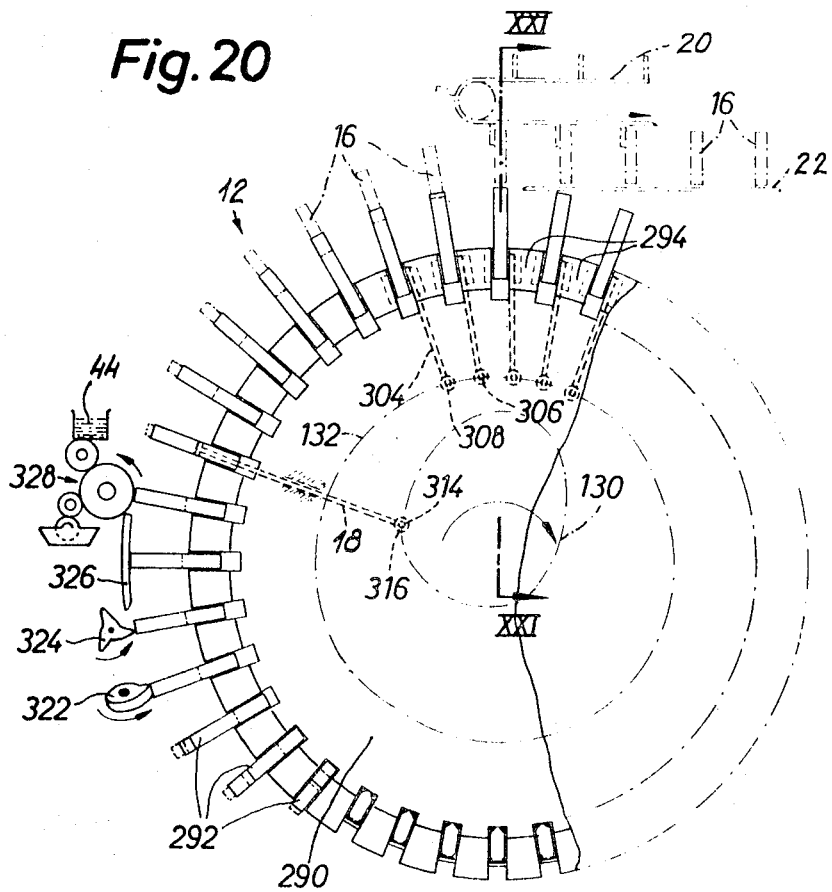
FIG. 20 is an end elevational view of a sealing conveyor which is utilized in the packaging machine of FIG. 5.

The sealing conveyor 12 which is shown in detail in FIGS. 20 and 21 comprises a turret 290 which is driven by the key 82 and carries a set of equidistant receiving means in the form of chambers or receptacles 292 each arranged to accommodate a filled partly finished pack 16b, i.e., a pack which is obtained upon introduction of a condensed group 38 into a partly finished empty pack 16a (see FIG. 3). Each receptacle 292 is turnable with a shaft 296 which is rotatable in brackets or lugs 294 of the turret 290. The shafts 296 receive motion from crank arms 298 which are articulately connected with links 300. The inner end portion of each link 300 is articulately connected with a radially movable push rod 304 which is guided in a block 302 of the turret 290. The radially innermost ends of the push rods 304 carry shafts 306 for roller followers 308 which extend into the groove of the fixed cam 132 mounted on the carrier 128 (see also FIG. 5). The configuration of the groove in the cam 132 will determine whether the receptacles 292 extend radially or axially of the turret 290 in predetermined angular positions of the conveyor 12.

Each receptacle 292 is associated with one of the aforementioned plungers 18 which serve to eject finished packs 16 from the corresponding receptacles and into the range of the transfer conveyor 20. The plungers 18 have rods which are guided in blocks 312 and whose innermost ends carry shafts 314 for roller followers 316 extending into the endless groove of the fixed cam 130. The configuration of the groove in the cam 130 will determine the radial positions of plungers 18 when the turret 290 is set in rotary motion.

The rim of the turret 290 carries an annulus of holders 318 which are adjacent to the lugs 294 and serve to support and to guide the back supports 140 (see also FIG. 5). One such back support 140 is provided for each receptacle 292, and each back support is guided by rolls 320 which are mounted on the respective holder 318. The rolls 320 guide the back supports 140 for movement in the axial direction of the turret 290 so that each back support is accurately aligned with one of the pushers 14. In addition, the back supports 140 register with the receptacles 292 and with the mandrels 206 when such receptacles and mandrels extend axially of the respective conveyors 12 and 10. It is clear that each back support 140 further registers with a tunnel 192 and with one of the group-forming chambers 148. The back supports 140 further carry the aforementioned roller followers 138 which extend into the endless groove of the fixed cam 136.

The turret 290 of the sealing conveyor 12 rotates along a series of additional devices which cooperate with the receptacles 292 to close and seal the top ends of successive packs so as to convert each pack 16b into a finished pack 16. Such additional closing and sealing devices include two rotary cam shaped tucking members 322 (only one shown in FIG. 20) whose lobes tuck in the minor flaps 42i, 42j (see FIG. 3) and which are driven at a requisite speed to complete the respective tucking operations before a receptacle 292 advances to the next processing station but while the turret 290 remains in motion. The tucking members 322 are followed by a driven star-shaped folding member 324 which folds the major flaps 42m of successive blanks 42 and thereupon by a stationary folding member 326 which folds the major flaps 42k. The length of the folding member 326 suffices to insure that the flaps 42k, 42m of successive paperboard blanks 42 are sealingly secured to each other. It will be recalled that the outer major flaps 42k are coated with adhesive while advancing along the paster PA of FIG. 17. The folding member 326 may be heated by electric current or in another suitable way.

The folding member 326 is followed by a device 328 which applies the revenue labels 44 in a manner as described in connection with FIG. 3, i.e., so that each label 44 overlies the major flaps 42k, 42m at the top end of the respective finished pack 16. The construction of the device 328 will be readily understood by referring to FIG. 20.

The operation of the packaging machine whose parts are illustrated in FIGS. 5–7, 10 and 12–21 as follows:

It is assumed that the hopper 60 of the main cigarette source 2 contains a satisfactory supply of cigarettes 34 and that each of the twenty channels 68 of the feed 4 is filled with cigarettes. The motor 88 is started and drives the turrets 146, 190, 204 and 290 at a predetermined constant speed. While a chamber 148 of the turret 146 advances along the discharge ends of successive channels 68, the respective feeding rollers 72 (see particularly FIG. 12) deliver into such chambers twenty cigarettes 34 to form therein a group 36 wherein the cigarettes are arrayed as shown in the upper right-hand portion of FIG. 3. As first explained hereinbefore in connection with FIG. 12, the first or trailing feeding roller 72 causes a first cigarette 34a to enter the leading groove 182a in the outer surface of the corresponding bottom wall 180 which latter is then closely adjacent to the periphery of the turret 146 to make sure that the cigarette 34a covers a relatively short distance in response to the action of jets of compressed air which issue from the ducts 164, see FIG. 10. The second feeding roller 72 delivers a cigarette 34b into the trailing groove 182b and the third feeding roller 72 causes a cigarette 34c to come to rest on the crest 182c between the grooves 182a, 182b. The fourth feeding roller 72 causes a cigarette 34d to enter the chamber 148 and to come to rest at a level outwardly of the leading cigarette 34a, the fifth feeding roller 72 causes a cigarette 34e to come to rest outwardly of the cigarette 34b, and the sixth feeding roller 72 transfers a cigarette 34f to a level outwardly of the cigarette 34c. The same pattern is followed while the corresponding chamber 148 advances below the remaining fourteen feeding rollers 72 so that the chamber 148 ultimately accommodates a group 36 of twenty parallel cigarettes. The corresponding bottom wall 180 sinks gradually by moving toward the axis of the turret 146 so that each of the successively delivered twenty cigarettes 34a, 34b, etc. covers the same or substantially the same distance while moving from the respective feeding roller 72 and into the allocated zone of the chamber 148. As shown in FIG. 12, the next-to-last feeding roller 72 transfers a cigarette 34s which forms the outermost cigarette of the leading layer of seven cigarettes, and the twentieth or leading roller 72 transfers a cigarette 34t which forms the outermost cigarette of the trailing layer of seven cigarettes.

When the assembly of a group 36 is completed, the corresponding pusher 14a (see FIG. 2) begins to move axially toward the turret 190 of the compressing conveyor 8 and shifts the thus assembled group into the registering tunnel 192. When the shifting of the group 36 is completed, the corresponding roller follower 200 moves past the condensing station 202 (see FIG. 14) whereby the associated jaw 196 performs a movement radially outwardly of the turret 190 and compacts the group 36 by subjecting it to stresses acting at right angles to the axes of cigarettes 34 to convert the group 36 into a condensed or compressed group 38. The group 38 is dimensioned in such a way that it can readily enter the right-hand axial end of the corresponding mandrel 206.

Even before the pusher 14a shifts a group 36 into the adjacent tunnel 192 of the turret 190, the block building means on and adjacent to the conveyor 10 begin to build a pack which will ultimately receive the condensed group 38. It is to be noted that FIG. 3 illustrates the various stations S1–S27 in properly timed sequence so that an observation of FIG. 3 allows for convenient determination of the exact moment when a mandrel 206 engages a freshly delivered tinfoil blank 40 and the exact condition and position of the respective group 36 or 38 with reference to the blank. Thus, and referring now in particular to FIG. 17, the leading end of the web 252 coming from the reel 250 is entrained by the suction drum 254 and is severed by one blade of the revolving knife 256 so that the latter forms a fresh tinfoil blank 40. The driven guide rolls 258 feed the blank onto the guide bars 260 (see the stage Z5 in FIG. 3) so that the blank is located in the path of and is entrained by the approaching mandrel 206. The associated draping member 220 is then caused to move against the mandrel 206 and converts the blank 40 into a U-shaped body 42a (see the stage Z6 in FIG. 3). The body 40a then advances into the range of the drapers or sleeve formers 262 which convert it into a sleeve 40b (stage Z7 in FIG. 3). The associated clamping member 222 is then caused to move against the overlapping longitudinal edge portions of the sleeve 40b and prevents opening of the sleeve after the latter moves beyond the drapers 262. Movements of the clamping member 222 are regulated by the fixed cam 120 whose groove receives the followers 238. Thus, when it moves beyond the drapers 262, each successive blank 40b is held by the corresponding draping member 220 and by the corresponding clamping member 222, both of these members pressing the sleeve 40b against the external surface of the corresponding mandrel 206. While being so held, the sleeve 40b reaches the movable folding member 266 which is operated by the eccentric drive 264 to fold the major flap 40d. The stationary folding member 268 thereupon folds the major flap 40c over the flap 40d (see the stage Z8 in FIG. 3) so that the sleeve 40b is converted into a deformed blank 40g whose minor flaps 40e, 40f still extend outwardly from the thus folded major flaps 40c, 40d. In the meantime, the draping member 220 moves away from the mandrel 206 but the clamping member 222 continues to bear against the overlapping edge portions of the deformed blank 40g. Thus, and since the draping member 220 has moved away, the advancing rolls 276 can supply onto the guide bars 278 a freshly coated paperboard blank 42 so that the blank 42 enters the gap between the draping member 220 and the mandrel 206. The device which includes the paster PA, the advancing rolls 276 and the suction drum 274 operates intermittently, and its operation is timed in such a way that the guide bars 278 receive a freshly coated blank 42 (see the stage Z9 of FIG. 3) at the exact moment when the blank 42 can enter the gap between a mandrel 206 and the associated draping member 220. The mandrel 206 entrains the blank 42 and the draping member 220 is caused to move toward the front panel of the mandrel to convert the blank 42 into a U-shaped body 42a (see the stage Z10 in FIG. 3). Such movement of the draping member 220 is caused by the cam 122. The U-shaped body 42a then moves past the two drapers or sleeve formers 280 which transform it into a sleeve 42b (see the stage Z11 in FIG. 3). The follower 242 of the associated clamping member 224 then engages the fixed cam 244 (see the top portion of FIG. 18) whereby the member 224 clamps the overlapping longitudinally extending edge portions of the sleeve 42b against the adjoining panel of the mandrel 206. The clamping action of the member 224 is selected in such a way that the overlapping edge portions of the sleeve 42b are bonded to each other by adhesive applied during travel of the blank 42 along the paster PA. The mandrel 206 then moves past the tucking members 282 which tuck in the minor flaps 42c, 42d (see the stage Z12 in FIG. 3). While moving past the folding member 284, the latter is operated by its eccentric drive 286 to fold the major flap 42f, and the fixed member 288 thereupon folds the major flap 42e (see the stage Z13 in FIG. 3) and holds the latter against the flap 42f for an interval of time which suffices to insure that the two major flaps are securely bonded to each other. As stated before, the folding member 288 may be heated by electric current or in another suitable way, and the same holds true for the folding member 268. While it approaches the tucking members 282, each sleeve 42b is held by the clamping members 222 and 224 and by the draping member 220 so that it cannot change its position during tucking and subsequent folding.

As soon as a partly finished pack 16a moves beyond the stationary folding member 288, the cam 124 causes the corresponding mandrel 206 to move from a position in which it extends radially to a position in which it extends axially of the turret 204 whereby the still open top end of the pack 16a faces toward the compressing conveyor 8, i.e., toward the adjacent open end of the associated tunnel 192. Such turning of the mandrel 206 is effected by the corresponding shaft 208, crank arm 210, link 212, push rod 214, shaft 216 and roller follower 218 (see particularly FIG. 18). Gradual movement of successive mandrels 206 (which have advanced past the fixed folding member 288) from a radial position to an axial position can be readily seen in the right-hand part of FIG. 17. When a mandrel 206 assumes such axial position with reference to the turret 204, the associated pusher 14c (see FIG. 2) begins to enter the aligned tunnel 192 and starts to shift a condensed group 38 through the open top end of the partly finished pack 16a. While the pusher 14c starts to move to the left and beyond the axial position shown in FIG. 2, the corresponding back support 140 moves against the closed bottom end of the pack 16a (i.e., against the sealed major flaps 42e, 42f, see FIG. 3). Such movement of the back support 140 with reference to its holder 318 (see FIGS. 5 and 21) is brought about by the follower 138 and cam 136. The righward stroke of the back support 140 is selected in such a way that the back support engages the bottom end of the pack 16a not later than at the time when the corresponding pusher 14 begins to move from the position 14c (see FIG. 2) toward and beyond the position 14d. It will be noted that the transfer of groups 36 from the conveyor 6 into the mandrels 206 involves two shifting steps and that the condensing or compacting step in the tunnels 192 precedes the second shifting step. While undergoing a condensing treatment, the groups continue to orbit about the shaft 24 so that such treatment adds nothing to the time necessary for completion of a packing operation. When the transfer of a condensed group 38 into a partly finished pack 16a is completed (see the stage Z15 in FIG. 3), the corresponding pusher 14d begins to advance the group 38 from and beyond the interior of the associated mandrel 206 whereby the back support 140 follows such movement to prevent uncontrolled deformation of the pack 16a during transfer into the corresponding receptacle 292 on the turret 290 of the sealing conveyor 12. The back support also prevents opening of freshly formed seams between the overlapping major flaps 42e, 42f of the freshly formed pack 16a. Of course, and as the pusher 14d begins to enter the interior of the associated mandrel 206, the condensed group 38 causes the corresponding pack 16a to be stripped off the mandrel and to gradually enter the corresponding receptacle 292. The back support 140 resists the deforming action of the leading ends of cigarettes which form the condensed group 38 and thus insures that the bottom end of the pack 16b remains intact.

The receptacle 292 which is about to receive a pack 16b has been moved from a radial to an axial position with reference to the turret 290 of the sealing conveyor 12, and such turning of the receptacle 292 was carried out by the shaft 296, crank arm 298, link 300, push rod 304, shaft 306, roller follower 308 and fixed cam 132 (see particularly FIG. 21). As soon as a pack 16b is properly accommodated therein, the corresponding receptacle 292 is turned back from axial to radial position so as to enable the additional closing and sealing devices shown in the left-hand portion of FIG. 20 to complete closing and sealing of the top end of the pack 16b. Gradual movement of successive receptacles 292 from axial to radial position is clearly shown in the lower part of FIG. 20 (see the positions of receptacles 292 which approach the tucking members 322).

Once the shifting of a pack 16b into the corresponding receptacle 292 is completed, the associated pusher 14e starts to move back to its original position to the right of the conveyor 6 (see the upper part of FIG. 2). Such movement of the pusher 14e is effected by the corresponding roller follower 106 and by the operating cam 108 as shown in FIG. 5. The operating cam 136 causes the back support 140 to move to the left, as viewed in FIG. 21, so that the back support cannot interfere with turning of the receptacle 292 to radial position. The idle or starting position of a back support 140 is shown in FIG. 5.

When the movement of a receptacle 292 to radial position is completed, the minor flaps 42i, 42j (see FIG. 3) of the pack 16B are engaged by the driven tucking members 322 shown in FIG. 20 so that these members convert the pack 16B into a body shown in FIG. 3 at Z20. The star-shaped folding member 324 then folds the major flap 42m and the fixed folding member 326 that the pack 16 is finished excepting for the application of the revenue label 44. This label 44 is applied by the device 328 shown in the left-hand part of FIG. 20 so that the pack 16 then assumes a form as illustrated at Z22 in the lower right-hand corner of FIG. 3. The label 44 is coated with adhesive so that it performs a very strong sealing action by maintaining the major flaps 42k, 42m in folded positions.

The cam 120 thereupon causes the rod of the corresponding plunger 18 to move radially outwardly and to expel the finished pack 16 (with a revenue label 44 applied thereto) from the corresponding receptacle 292. This is shown in the upper part of FIG. 20. The expulsion or ejection of a pack 16 is completed while the pack enters the range of the transfer conveyor 20 which moves the pack onto the take-off conveyor 22. The transfer conveyor 20 is shown in the form of an endless belt having transversely extending motion transmitting vanes which engage successively ejected packs 16 and move them onto the conveyor 22. As mentioned hereinbefore, the conveyor 22 can deliver finished packs 16 to storage or to a carton filling machine, not shown.

When it has completed the ejection of a finished pack, the plunger 18 is caused to move radially inwardly and the cam 132 thereupon causes the respective receptacle 292 to turn from radial to axial position so that the receptacle is ready to receive the next pack 16b.

The number of chambers 148 equals the number of tunnels 192, of mandrels 206 and receptacles 292. Furthermore, and since each of the receptacles 292 and mandrels 206 may be placed into accurate alignment with the corresponding tunnel 192 (and hence with one of the chambers 148), a single pusher 14 can shift groups 36 and 38 of articles 34 from the associated chamber 148 and all the way into the corresponding receptacle 292. This results in considerable simplification of the packaging machine. Also, such construction allows for continued orbital movement of articles 34 from the moment they enter a chamber 148 and to the moment when a finished pack 16 leaves the conveyor 12. Intermittent axial movements of articles take place simultaneously with orbital movement about the common axis of the conveyors 6, 8, 10 and 12. This enables the packaging machine to utilize a very simple drive because all of the turrets rotate at the same speed and their rotary movements need not be interrupted during entry of articles into the chambers 148, during shifting of articles in parallelism with the axis of the main shaft 24, or during ejection of packs 16 into the range of the transfer conveyor 20. Furthermore, the pushers 14, the back supports 140 and the plungers 18 can orbit with the conveyors 6, 8, 10 and 12, and they may derive motion from the drive for such conveyors.

The improved packaging machine with continuously driven conveyors has been found to be capable of turning out packs at a rate exceeding by more than fifty percent the output of presently known packaging machines. Such unexpectedly high output of the improved packaging machine is due, to a considerable extent, to the novel mode of feeding cigarettes during the formation of groups 36. Thus, each of successively assembled groups 36 is built up gradually while the cigarettes 34 of the thus growing groups move sideways and while such cigarettes cover relatively short distances by descending from the level of the respective feeding rollers 72 to the bottom walls 180 or to positions above the cigarettes of partly assembled groups. The rate at which the groups 36 are formed is much higher than in heretofore known packaging machines because the conveyor 6 need not be arrested whenever one of its chambers receives one or more cigarettes.

The turnability of mandrels 206 and receptacles 292 between radial and axial positions (with reference to the common axis of the respective conveyors) constitutes a highly advantageous feature of our invention. The various draping, folding, tucking, retaining and sealing instrumentalities may be provided on and adjacent to the conveyors 10, 12 in optimum positions for convenient access, for visual observation of their functions, and for most effective utilization to insure rapid, accurate and reliable draping, folding, tucking, closing, and sealing operations. Such turnability of parts 206, 292 also enables the packaging machine to feed and to transport the blanks 40 and 42 in optimum positions for conversion into successive empty and sealed packs. Moreover, and since the parts 206 and 292 orbit continuously about the axis of the main shaft 24, the feed of blanks 40, 42 can take place at a desired point and in an optimum position of such blanks for ready conversion into envelopes. As clearly shown in FIG. 17, the blanks 40 and 42 are fed substantially radially of and toward the axis of the conveyor 10, i.e., in a direction which is different from the direction of orbital movement of the mandrels 206. This reduces the length of intervals between successive deliveries of blanks and enables the conveyors 6, 8, 10 and 12 to travel at a higher speed. The blanks are fed by moving edgewise which is desirable because such mode of feeding also contributes to a reduction in the length of intervals between successive feeds of sheet stock.

Prior to introduction of condensed groups 38 into successive open-ended packs 16a, each such pack 16a is moved from a radial position to an axial position. The opposite holds true for filled packs 16b, i.e., each of these packs has its top end closed and sealed while orbiting in a radial position so that it must be turned from a position of parallelism with the axis of the main shaft 24 to a position in which its open end faces radially outwardly so that the closing and sealing of open ends may be completed while the packs 16b travel with the receptacles 292. The axial ends of the chambers 148 and tunnels 192 are open to permit entry and passage of pushers 14. This also applies for the mandrels 206 and for the receptacles 292. Both ends of each receptacle 292 must be open to permit entry of a plunger 18 at one end and the resulting ejection of a pack 16 at the other end.

FIG. 22 illustrates certain details of a packaging machine which can provide each pack 16 with a third envelope or layer made of a transparent plastic blank 46 of the type shown in FIG. 4. This packaging machine differs from the machine of FIG. 1 (including the parts indicated by phantom lines) in that the conveyors 26, 28, too, are mounted on the main shaft 24. The construction of the conveyors 26, 28 is similar to that of the conveyors 10 and 12. Thus, the turret of the second "pack building" conveyor 26 comprises an annulus of hollow prismatic mandrels 334 each of which is turnable between an axial and a radial position by means of a cam 338 provided on a fixed carrier 336 which is attached to the main shaft 24. The second "sealing" conveyor 28 supports an annulus of receptacles 340 which are turnable between radial and axial positions by a cam 344 mounted on a stationary carrier 342. Each of the pushers 30 (see also FIG. 1) comprises two plate-like transfer elements 346, 348. The elements 346 serve to shift finished packs 16 from the sealing conveyor 12 into the mandrels 334 of the conveyor 26, and the elements 348 are used to shift packs 16 with partly finished transparent wrappers 46h (see the stage Z36 in FIG. 3) into the receptacles 340 of the conveyor 28. One such pusher 30 is provided for each mandrel 334, i.e., for each receptacle 340, and each pusher 30 is movable in parallelism with the axis of the main shaft 24. These pushers 30 are mounted on holders 352 provided therefor on the turret of the conveyor 28 and carry roller followers 354 extending into the groove of a fixed cam 358 provided on a stationary carrier 356. Thus, the configuration of the groove in the cam 358 determines the axial positions of pushers 30 when the conveyor 28 rotates.

In order to facilitate transfer of packs 16 from the conveyor 12 into the mandrels 334 (transfer elements 346) of the conveyor 26, and to facilitate transfer of packs 16 with partly finished transparent envelopes 46e thereon into the receptacles 340 of the conveyor 28 (transfer elements 348), both narrow sides of receptacles 292 on the conveyor 12 shown in FIG. 22 and one narrow side each of the mandrels 334 on the conveyor 26 are formed with slots, and the receptacles 292 and mandrels 334 respectively cooperate with movable bottom walls 374, 376. Each mandrel 334 is slotted at that side which faces the respective receptacle 292 when these mandrels and receptacles extend radially of the respective conveyors 26 and 12. The bottom walls 374, 376 are movable by link trains 378 each of which includes a radially innermost portion carrying a shaft 380. Each shaft 380 mounts a follower roller 382 which extends into the groove of a fixed cam 384 provided on a stationary carrier 386. The cam 384 can shift the bottom walls 374, 376 between two radial positions in one of which these bottom walls respectively extend into the receptacles 292 and mandrels 334 (while the receptacles 292 and mandrels 334 extend radially of the respective conveyors 12 and 26) and in the other of which the bottom walls 374, 376 are withdrawn radially inwardly so that the receptacles 292 and mandrels 334 may be turned from radial to axial positions. When extending into the receptacles 292 and mandrels 334, the bottom walls 373, 376 serve to support the packs 16 therein.

Since the packs 16' are finished only on the conveyor 28, the plungers 18 of the conveyor 12 are rendered inactive or are dispensed with. However, the conveyor 28 comprises a set of radially movable plungers 18' which eject finished packs 16' and move them into the path of vanes on the travelling transfer conveyor 20' which delivers the packs seriatim to the take-off conveyor 22', see FIG. 1.

The drive for the conveyors 26, 28 of FIG. 22 receives motion from the motor 88 of FIG. 5 in the following way: The turret of the conveyor 10 comprises a series of projections 360 each of which is aligned with a similar projection 362 of the conveyor 12. Each of the projections 360 is connected with a projection 362 by a motion transmitting bolt 364. Projections 366 of the conveyor 26 register with similar projections 368 of the conveyor 28 and are connected therewith by motion transmitting bolts 370. The turrets of the conveyors 12 and 26 are coupled to each other by one or more keys or wedges 372.

In the packaging machine of FIG. 22, the mandrels 206, 334 of the conveyors 10, 26 and the receptacles 292, 340 of the conveyors 12, 28 are respectively turned between radial and axial positions by separate cams 124, 132 and 338, 344. However, it is clear that the construction of this machine can be simplified by providing common cams for each pack building conveyor (10, 26) and the associated sealing conveyor (12, 28).

The packaging machine of FIG. 22 may comprise one or more additional conveyors 26 and one or more additional conveyors 28, depending on the number of layers or envelopes in each pack. Prior to each transfer or shifting from a conveyor 26 to a conveyor 28, the packs are successively moved from radial to axial positions and, upon completion of such shifting, each successive pack is again moved from an axial position to a radial position.

Various other modifications of the improved packaging machine may be carried out without departing from the spirit of our invention. For example, the feed 4 may be modified by replacing the channels 68 and feeding rollers 72 or 72A with a single chute which can oscillate back and forth and discharges twenty cigarettes 34 in rapid sequence to thereby fill one chamber in the turret of the group forming conveyor at a time. This modification of the feed is illustrated in FIGS. 23 to 27.

Referring first to FIG. 23, the frame 388 of the packaging machine supports a hopper or magazine 390 which is analogous to the hopper 60 of FIG. 5. The outlet of this hopper is located above the intake end of an elongated chute 392 which is pivoted at 394 and whose lower or discharge end is oscillatable between the solid-line and phantom-line positions of FIG. 23 in which the chute respectively abuts against fixed stops 396, 398 of the frame 388.

The chute 392 comprises two side walls 404, 406, (see FIG. 24) and two partitions 400, 402 which subdivide its interior into three elongated passages each of which can accommodate a stack of superimposed cigarettes 34. A strong return spring 456 urges the chute 392 to the solid-line (starting) position of FIG. 23 in which the chute abuts against the stop 396.

The side walls 404, 406 and the partitions 400, 402 respectively comprise movable extensions or baffles 408, 414 and 410, 412 (see particularly FIG. 24) which are guided by the parts 404, 406, 400, 402 and the upper end of each of which carries a roller follower 416. The four followers 416 extend into the groove of a cam 418 which is affixed to the frame 388 at a level above the turret 420 of the group forming conveyor 6B and extends beyond both end positions of the oscillatable chute 392.

The lower end portions of the baffles 408, 410, 412 respectively carry swingable gates 422, 424, 426 each of which is secured to the respective baffle by a horizontal hinge whose axis is parallel with the axis of the conveyor 6B. The gates 422, 424, 426 are coupled to each other by a connecting rod 428 so that they may be rocked as a unit. The means for effecting movements of the gaes 422, 424, 426 comprises a mechanism which is shown in FIGS. 24 to 26 and includes a lever 430 fixed to the gate 422 and cooperating with a reciprocable roller 432. The lever 430 is biased by a helical spring 434 which is mounted on a bracket 436 carried by the baffle 408. The bracket 436 further comprises a stop shoulder 438 against which the lever 430 abuts whe nthe spring 434 is free to expand and when the upper end of the lever 430 is engaged by the roller 432 in a manner as shown in FIG. 24. The gates 422, 424, 426 are then held in closed positions in which they prevent gravitational descent of cigarettes 34 through the discharge end of the chute 392.

The bracket 436 also serves as a guide for a substantially vertically reciprocable guide rod 440 which supports the roller 432 and is further guided in a bearing sleeve 442 provided on the baffle 408. A spring 444 (see FIG. 25) operates between the sleeve 442 and a collar on the guide rod 440 and tends to move the latter downwardly so that a second collar of the rod 440 abuts against the top face of the sleeve 442. The roller 432 is mounted on a shaft 446 of the guide rod 440. The lower end portion of this guide rod 440 carries a roller follower 448 which tracks successive cams 452 of the turret 420, one such cam 452 being provided at the trailing end of each successive chamber 450 in the periphery of the turret 420, see FIGS. 25 and 26. The drive means for entraining the discharge end of the chute 392 in synchronism with movement of the turret 420 comprises a series of motion transmitting protuberances 454 one of which is located directly behind each successive chamber 450 and engages the gate 422 when the latter is caused to assume the open position shown in FIG. 25. In this way, the turret 420 automatically entrains the discharge end of the chute 392 and moves it away from the stop 396 against the bias of the return spring 456. It will be noted that the follower 448 at the lower end of the guide rod 440 is located directly behind the trailing gate 422 so that it can cooperate with successive cams 452 of the turret 420.

The turret 420 is provided with a lowering means including an annulus of radially movable bottom walls 458, one for each chamber 450. Each of these bottom walls is provided with a roller follower 460 which extends into the groove of a specially configured operating cam 462 shown in FIG. 23. The operating cam 462 guides the bottom walls 458 in such a way that, while the lower end of the chute 392 discharges cigarettes 34 into a chamber 450, the respective bottom wall 458 descends at a rate which is proportional with the extent to which the chamber is being filled. In other words, each cigarette 34 which enters a chamber 450 covers the same or substantially the same distance before it comes to rest on the bottom wall 458 or on the cigarettes which are already accommodated in the chamber. Each bottom wall 458 preferably comprises two plates or sections and each such section is adjacent to one axial end of the respective chamber 450 so that the sections support only the ends of cigarettes 34. The cigarettes 34 of groups 36 in chambers 450 are arranged in quincunx formation.

The operation of the feed which is shown in FIGS. 23 to 27 is as follows:

The turret 420 of the group forming conveyor 6B is driven at a constant speed. When an empty chamber 450 enters the filling station (below the fixed cam 418) and registers with the discharge end of the chute 392 which then abuts against the stop 396, the corresponding cam 352 of the turret 420 engages the roller follower 448 and pushes the guide rod 440 upwardly, i.e., against the bias of the spring 444. This causes the roller 432 to release the upper end of the lever 430 whereby the spring 434 expands and moves the lever 430 to the position shown in FIG. 25. Such movement of the lever causes the gates 422, 424, 426 to assume open positions and to allow cigarettes 34 to descend by gravity and to enter the registering chamber 450. In other words, the gates 422, 424, 426 will leave their closed positions (FIG. 24) when the lever 430 moves away from the stop shoulder 438 of the bracket 436. The discharge end of the chute 392 is entrained with the chamber 450 because the opened gate 422 is engaged by the motion transmitting protuberance 454, and the chute 392 continues to discharge cigarettes which enter the adjoining chamber 450 in a manner as illustrated in FIGS. 25 and 26. The outer surface of each bottom wall 458 is formed with two grooves and with a crest in the same way as described in connection with FIG. 12, and the bottom wall 458 of the chamber 450 which is being filled with cigarettes descends toward the axis of the turret 420 because its follower 460 tracks an inwardly curved portion of the operating cam 462 (see FIG. 23). When the chamber 450 is filled, it contains a group 36 (see FIG. 27) which includes two outer layers of seven cigarettes each and a median layer of six cigarettes. When the filling operation is completed, the chute 392 reaches the stop 398 and is held against further movement with the turret 420. The protuberance 454 then rocks the gates 422, 424, 426 in a counterclockwise direction, as viewed in FIGS. 25 and 26, whereby the gates return to closed positions and prevent further discharge of cigarettes. FIG. 26 shows the gates 422, 424, 426 in intermediate positions in which these gates still prevent the descent of cigarettes from the corresponding passages of the chute 392. Thus, and as shown in FIG. 26, the lever 430 is still spaced from the stop shoulder 438 and its upper end portion is not as yet held by the roller 432. FIG. 24 shows the gates 422, 424, 426 in fully closed positions. The lever 430 abuts against the shoulder 438 of the bracket 436 and the roller 432 holds this lever in such position so that the gates 422, 424, 426 positively prevent further evacuation of cigarettes from the chute 392. The purpose of the cam 418 is to insure that the discharge end of the chute 392 is invariably located at the same distance from the registering chamber 450 while the discharge end moves in a direction from the stop 396 toward the stop 398. In other words, the cam 418 insures that the baffles 408, 410, 412, 414 move downwardly or upwardly, depending on the angular position of the chute 392. When the gates 422, 424, 426 return to closed positions, the cam 418 lifts the baffles 408, 410, 412, 414 sufficiently to permit unimpeded return movement of the discharge end of the chute 392 under the bias of the spring 456. The spring 456 will contract immediately after the protuberance 454 of the turret 420 is allowed to bypass the gate 422. The bias of the spring 456 is strong enough to return the chute 392 into abutment with the stop 396 in good time for filling of the next-following chamber 450. During such return movement, the gates 422, 424, 426 remain in closed positions to prevent uncontrolled evacuation of cigarettes. The follower 448 is then engaged by the next-following cam 452 and the corresponding protuberance 454 engages the gate 422 to move the channel 392 away from the stop 396 and the filling operation is repeated in the aforedescribed manner.

FIG. 23 shows that the grooves in the outer surfaces of the bottom walls 458 are somewhat deeper than the grooves in the bottom surfaces of the chambers 450. This is done on purpose to make sure that the three passages of the chute 392 invariably discharge three horizontally (or substantially horizontally) aligned cigarettes 34 at a time. Thus, and as shown at 500 in FIG. 23, a freshly filled chamber 450 will contain twenty cigarettes which are not arrayed in the same way as shown in FIG. 27 because the respective bottom wall 458 must descend by an additional increment. In response to such further descent of the bottom wall 458, the cigarettes are automatically rearranged by gravity and then form a group 36 as shown in FIG. 27 or in the rightmost chamber 450 of the turret 420 shown in FIG. 23. By making the grooves in the outer surfaces of the bottom walls 458 deeper than the grooves in the bottom surfaces of the chambers 450, we insure that each of the closed gates 422, 424, 426 abuts against the lowermost cigarette 34 in the respective passage of the chute 392, i.e., that the three lowermost cigarettes 34 are located at the same level (see FIG. 24).

An important advantage of the group forming method which may be carried out by the feed 4 and group forming conveyor 6 or 6A, or by the feed of FIGS. 23 to 27 and the group forming conveyor 6B is that the step of assembling successive groups requires very little time and can be carried out while the group forming conveyor 6, 6A or 6B rotates without any interruptions. It was found that such mode of assembling groups 36 raises the output of the packaging machine by at least 50 percent. The output is particularly high if the packaging machine utilizes the feed 4 and the group forming conveyor 6 or 6A wherein a series of groups 36 are being assembled in a simultaneous operation, i.e., the condition of twenty successive groups which are being assembled in a manner as described in connection with FIG. 12 differs solely in that each preceding group contains all the cigarettes of the next following group plus a single cigarette. Additional savings in time are achieved because the feed and the group forming conveyors move the cigarettes 34 sideways, i.e., the cigarettes start to move axially only at the time when the formation of a group is completed.

The feature that the improved packaging machine comprises lowering means including guide rails 156 (FIG. 8), radially reciprocable bottom walls 180 (FIG. 12) or similar bottom walls 458 (FIG. 23) insures that the gravitational descent of cigarettes ino the chambers of the group forming conveyor 6A, 6 or 6B is very short so that the cigarettes cannot undergo any appreciable deformation and do not lose tobacco at the ends. The parts 156, 180 and 458 insure that the cigarettes which are first to enter the chambers of the conveyor 6A, 6 or 6B need not drop all the way to the bottom surfaces of such chambers but are itnercepted and descend at a controlled rate. Such mode of forming the groups 36 also contributes to greater accuracy in relative positioning of the cigarettes 34 in each group.

The packaging machine of FIG. 28 comprises a turret-shaped group forming conveyor 501 and a turret-shaped pack building and sealing conveyor 502. Each of these conveyors is formed with receiving means for black-shaped commodities each of which includes a group of arrayed smoking articles, for example cigarettes. The U-shaped receiving means or chambers 552 of the conveyor 502 are radially offset with reference to receiving means or chambers 503 of the conveyor 501. The feed which supplies articles into the chambers 503 of the conveyor 501 includes a duct or chute 504 which corresponds to the chute 392 of FIG. 23. The hub of the conveyor 501 is mounted on a sleeve-like bearing 506 which rotates on a hollow shaft 507. The drive for the conveyor 501 includes an electromotor which transmits torque by way of a transmission (not shown) to an extension 508 of the hub. The transmission includes a gear which is fixed to the extension 508. The latter is formed with several ribs 509 which support and rotate the conveyor 502. This conveyor has a hub surrounding a sleeve bearing 511 which is rotatable on the shaft 507. The transfer means of the machine shown in FIG. 28 comprises a first transfer unit 512 including discrete transfer members or pushers 513 each of which registers with one of the chambers 503 and is reciprocable in axial direction of the shaft 507. The pushers 513 have plate-like front end portions 514 which can enter the adjoining chambers 503 when the shanks of pushers are caused to move in a direction to the right, as viewed in FIG. 28. Each pusher 513 is guided in an arm 516 which is secured to or integral with the conveyor 501. The shifting or displacing means 517 for reciprocating the pushers 513 comprises a fixed operating cam 518 having a groove for roller followers 519 each of which is affixed to the shank of a pusher 513. The cam 518 is mounted on a carrier 521 which is provided with a bearing sleeve 522 surrounding the rotating extension 508. The carrier 521 is stationary.

The means 512 for supplying blanks of wrapping material is located past the conveyor 501, as seen in the direction of travel of groups of smoking articles, and includes a reel (not shown) containing a supply of convoluted sheet-like wrapping material 526 which is severed at regular intervals by a rotary knife or cutter 527 located downstream of an advancing roller 524.

The aforementioned transfer means further comprises a second transfer unit including pivotable or rockable transfer members 528 each of which can transfer a group of smoking articles and a blank to a chamber 552 of the conveyor 502. Each transfer member 528 is a bell crank lever one arm of which is provided with a U-shaped deforming head 529 and the other arm of which carries a roller follower 531 arranged to track the peripheral face of a stationary operating cam 532 forming part of a flange 533 affixed to the shaft 507. The pivot 534 of the lever 528 is mounted in an arm 536. A spring 537 biases the lever 528 in a clockwise direction, as viewed in FIG. 28, so as to maintain the roller follower 531 in engagement with the face of the cam 532. The arm 536 has an end portion which is adjacent to the conveyor 501 and carries a hollow deforming mandrel 538. The other end portion of the arm 536 carries a pinion 539 mounted on a bracket 570. The pinion 539 meshes with a rack 541 the right-hand end of which carries a roller follower 542 extending into the groove of a fixed operating cam 543.

The side faces of the conveyor 502 are provided with radial recesses or slots for radially movable levers 544 having roller followers which extend into the groove of a fixed operating cam 546. The left-hand ends of levers 544 are formed with eyes 547 fixedly receiving the inner ends of rods 548 which are reciprocable in guides 549 affixed to the conveyor 502. The outer end portions of the rods 548 carry deforming plates 551 which can enter the U-shaped chambers 552 of the conveyor 502. Each chamber 552 is inwardly adjacent to two deforming jaws 553 and two deforming jaws 554 best shown in FIG. 32. The jaws 553 have mating teeth 556 and are rotatable with reference to each other by a rack 557 which meshes with a pinion 560 on one of the jaws 553 and carries a roller follower 558 extending into the groove of a fixed operating cam 559. The jaws 554 have arms which carry roller followers 561 tracking the faces of a fixed operating cam 562. The jaws 554 are adjacent to a channel 563 which serves as a means for accepting or receiving finished packs from the conveyor 502. One such channel is provided for and rotates with each of the chambers 552. The take-off means which receives finished packs from channels 563 is not shown in FIG. 28.

The operation:

Rod-shaped articles (e.g., cigarettes) are transported from the source (not shown) into the chute or duct 504 which transfers articles into the chambers 503 in a manner as described in connection with FIGS. 23 to 27. The pushers 513 rotate with the conveyor 501 and are caused by cam 518 to perform strokes in a direction to the right, as viewed in FIG. 28, to thereby transfer fully assembled groups of, for example, twenty smoking articles each into the adjoining hollow deforming mandrels 538 which are then aligned with the adjacent chambers 503. Each chamber 503 is open at three sides, namely, at two axial ends of the conveyor 501 and its radially outer end so that the chute 504 can deliver articles through one side, that the plate 514 of a pusher 513 can enter the other side and that the plate 514 can expel a group by way of the third open side. The same applies for the U-shaped chambers 552 of the conveyor 502.

The supply means 523 causes a freshly severed blank 530 (see FIG. 29) to enter between a mandrel 538 and a pair of stationary deforming bars 540. When the mandrel 538 moves through the gap between the adjoining deforming bars 540, it cooperates therewith to effect a first or initial deformation of the blank 530 so that the blank is converted into a U-shaped body which is draped around three sides of a group of rod-shaped articles. As the conveyors 501, 502 continue to rotate about the shaft 507, the cam 532 causes successive transfer levers 528 to turn about their pivots 534 and to press the U-shaped deforming heads 529 against the partially deformed blanks 530 on the respective mandrels 538 whereby the heads 529 perform a deforming operation which is shown in FIG. 30. This involves draping one marginal portion of the partially deformed blank 530 against the adjoining side of the mandrel 538. The arms 536 then pivot in a clockwise direction, as viewed in FIG. 28, under the action of the cam 543 and racks 541 and advance (with the heads 529) through intermediate positions (FIG. 31) to introduce the mandrels 538 into the corresponding U-shaped chambers 552 of the conveyor 502. This results in automatic conversion of blanks 530 into tubes having open ends. The closing of radially outer ends of such tubes is effected in part by the jaws 553 which are caused to pivot under the action of cam 559 by way of the corresponding racks 557 and pinions 560. The jaws 553 thereby tuck the minor flaps at the outer ends of tubes in the chambers 552. The adhesive-coated major outer flaps are folded over the minor flaps and over each other by jaws 554 which are pivoted by the two faces of the cam 562. This completes closing of the outer end of a tube in the corresponding chamber 552. The resulting open-ended pack is then engaged by the plate 551 of the corresponding rod 548 and transferred into the adjoining channel 563 so that the open end of the pack is adjacent to the inner end of the channel. During transfer from a chamber 552 into the adjoining channel 563, the plate 551 engages the ends of articles in the open end of the pack whereby the pack (i.e., the deformed blank 530) is stripped off the corresponding mandrel 538. The closing of the inner end of the pack in the channel 563 is carried out in the same way as described in connection with operation of the jaws 553, 554 and is performed by the same jaws while such jaws close the outer end of the tube in the corresponding chamber 552. The dimensions of these jaws are such that they can simultaneously close the open outer ends of tubes in the chambers 552 and the open inner ends of packs in the channels 563.

An important advantage of the machine shown in FIG. 28 is that the blanks 530 undergo deformation during transfer (by members 528) from the first conveyor 501 to the second conveyor 502. This is achieved by providing the conveyor 502 with receiving means or chambers 552 which are radially offset with reference to the receiving means or chambers 503 of the conveyor 501 and by employing pivotable transfer members 528 which move radially of the conveyors 501, 502 during transfer of commodities (groups of rod-shaped smoking articles) and blanks 530 toward the chambers 552.

The arms 536 together constitute a conveyor which performs some functions of the conveyor 10 shown in FIG. 1, i.e., its receiving means or mandrels 538 cooperate with deforming members 529 and 540 to convert blanks 530 into sleeves or tubes while the arms 536 rotate with the conveyors 501, 502.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a machine for wrapping block-shaped commodities into wrapping material, particularly for packaging groups of rod-shaped smoking articles, a plurality of conveyors including coaxial rotary first and second conveyors respectively having a plurality of first and second receiving means for commodities; supplying means for delivering blanks of wrapping material to said first conveyors; deforming means including at least one first deforming device cooperating with said first conveyor to effect partial deformation of blanks about commodities in said first receiving means and at least one second deforming device to effect further deformation of deformed blanks about the commodities in said second receiving means; transfer means for transferring commodities and deformed blanks from said first to said second receiving means; and means for accepting commodities and the respective blanks from said second conveyor.

2. A structure as set forth in claim 1, further comprising group forming means for assemblying rod-shaped articles into groups to form said commodities for introduction into said first receiving means.

3. A structure as set forth in claim 2, wherein said group forming means comprises at least one further rotary conveyor having a plurality of chambers and further comprising a feed for supplying rod-shaped articles to said chambers to form therein said groups of articles.

4. A structure as set forth in claim 1, wherein the commodities are deformable and their dimensions in undeformed condition thereof exceed the dimensions of said first receiving means, and further comprising condensing means for deforming the commodities prior to admission into said first receiving means.

5. A structure as set forth in claim 4, wherein said condensing means comprises a further rotary conveyor having a plurality of receiving means for undeformed commodities and devices for deforming commodities in said last mentioned receiving means.

6. A structure as set forth in claim 1, wherein each of said first and second conveyors comprises a turret and said receiving means are disposed at the peripheries of the respective turrets.

7. A structure as set forth in claim 1, wherein each receiving means of at least one of said first and second conveyors has three open sides.

8. A structure as set forth in claim 1, further comprising a common shaft for said first and second conveyors and drive means for rotating said conveyors about the axis of said shaft.

9. A structure as set forth in claim 1, wherein each second receiving means is aligned with one of said first receiving means in axial direction of said first and second conveyors.

10. A structure as set forth in claim 1, wherein the number of said second receiving means equals the number of said first receiving means and wherein said transfer means comprises a discrete movable transfer member for each of said first receiving means and means for rotating said transfer members with said first and second conveyors and for moving said transfer members with reference to said first and second conveyors.

11. A structure as set forth in claim 10, wherein each of said second receiving means is aligned with one of said first receiving means in axial direction of said first and second conveyors and wherein each of said transfer members registers with one of said first receiving means and is reciprocable in axial direction of said first and second conveyors.

12. A structure as set forth in claim 1, wherein said second receiving means are offset with reference to said first receiving means in radial direction of said first and second conveyors.

13. A structure as set forth in claim 12, wherein said transfer means comprises transfer members movable radially of said first and second conveyors.

14. A structure as set forth in claim 1, wherein said transfer means forms part of said deforming means and includes devices for effecting deformation of blanks during transfer of such blanks from said first to said second conveyor.

15. A structure as set forth in claim 1, further comprising a source of articles, mobile group forming means, and feeding means for transferring articles from said source to said group forming means to assemble groups for transfer to said first receiving means, said source having at least one outlet for articles and said feeding means comprising at least one driven feeding member for transferring articles leaving said source to said group forming means.

16. A structure as set forth in claim 15, wherein said group forming means comprises a rotary conveyor.

17. A structure as set forth in claim 15, wherein said source comprises a plurality of outlets.

18. A structure as defined in claim 15, wherein said feeding member comprises means for effecting transfer of articles in predetermined orientation.

19. A structure as set forth in claim 15, wherein said feeding means comprises a plurality of feeding members for transferring articles which leave said outlet to said group forming means.

20. A structure as defined in claim 15, wherein said group forming means comprises a rotary conveyor and wherein said feeding member is rotatable about an axis which is at least substantially parallel to the axis of said last mentioned conveyor.

21. A structure as set forth in claim 15, wherein said feeding member is provided with duct means.

22. A structure as set forth in claim 21, further comprising suction generating means connected with said duct means when said feeding member transfers an article and a source of compressed fluid connected with said duct means during delivery of an article to said groupforming means.

23. A structure as set forth in claim 15, wherein said feeding member is provided with at least one recess for accommodation of articles during travel to said group forming means.

24. A structure as set forth in claim 23, wherein said feeding member is provided with duct means in the region of said recess and further comprising suction generating means connected with said duct means to hold an article in said recess during transfer of such article with said feeding member and a source of compressed fluid connected with said duct means to expel an article from said recess during delivery to said group forming means.

25. A structure as set forth in claim 15, wherein said feeding member comprises a chute having a receiving end arranged to receive rows of successive articles from said outlet and a discharging end for delivering articles to said group forming means, and means for moving said chute with said group forming means during delivery of articles from said chute to said group forming means.

26. A structure as set forth in claim 25, wherein said feeding means further comprises means for blocking the evacuation of articles by way of said discharge end during accumulation of said rows in said chute.

27. A structure as set forth in claim 26, further comprising means for inactivating said blocking means in automatic response to alignment of said discharge end with predetermined portions of said group forming means.

28. A structure as set forth in claim 27, wherein said predetermined portions of said group forming means constitute chambers.

29. A structure as set forth in claim 15, wherein said group forming means comprises a plurality of group-receiving chambers having bottom walls and means for moving said bottom walls with reference to said feeding means so that articles which are delivered into said chambers to form therein groups cover at least susbtantially the same distance during travel from said feeding member into the interior of one of said chambers.

30. In a machine for wrapping block-shaped commodities into wrapping material, particularly for packaging groups of rod-shaped smoking articles, a plurality of conveyors including coaxial rotary first and second conveyors respectively having a predetermined number of first and second receiving means for commodities; feeding means for assembling groups of articles to form said commodities not later than in said first receiving means; supplying means for delivering blanks of wrapping material; deforming means cooperating with at least one of said first and second conveyors to effect deformation of blanks about the commodities; transfer means including a transfer member for each of said first receiving means; and means for rotating said transfer members with and for moving said transfer members relative to said first and second conveyors to effect transfer of commodities and blanks from said first receiving means into said second receiving means.

31. A structure as set forth in claim 30, wherein said deforming means comprises first and second deforming devices respectively cooperating with said first and second conveyors to effect deformation of blanks about commodities in the first and second receiving means.

32. A structure as set forth in claim 30, wherein each of said first receiving means is aligned with one of said second receiving means in axial direction of said first and second conveyors and wherein said transfer members are reciprocable in axial direction of said first and second conveyors, each of said transfer members being in registry with one of said first receiving means and with the corresponding second receiving means.

33. A structure as set forth in claim 30, wherein said transfer members are pivotable relative to said first and second conveyors.

34. In a machine for packaging groups of rod-shaped articles, particularly cigarettes, a source of articles; a first and a second endless conveyor; drive means for moving said conveyors; means for delivering articles from said source to said first conveyor including feeding means for assembling articles in groups each of which contains a predetermined number of articles moving with said first conveyor, and means moving said feeding means in synchronism with said conveyors, at least during the assembly of said groups; means for supplying blanks of wrapping material to said second conveyor; pack building means for converting such blanks into open-ended packs which travel with said second conveyor; and transfer means for transferring groups from said first conveyor into the packs on said second conveyor.

35. A structure as set forth in claim 34, further comprising a third endless conveyor operatively connected with said drive means to move with said first and second conveyors, said transfer means being arranged to shift packs containing groups of articles from said second conveyor onto said third conveyor, sealing means for closing and sealing the open ends of packs on said third conveyor, and means for effecting removal of sealed packs from said third conveyor.

36. A structure as set forth in clam 35, further comprising a take-off conveyor and means for transferring removed packs onto said take-off conveyor.

37. A structure as set forth in claim 34, wherein said first conveyor is provided with a plurality of equidistant chambers for said groups and said feeding means is arranged to assemble said groups in successive chambers of said first conveyor, said second conveyor having a plurality of pack supporting members and said pack building means being arranged to build packs on successive pack supporting members.

38. A structure as set forth in claim 37, wherein said pack supporting members are hollow mandrels each of which can receive a group of articles, each of said mandrels being movable to and from a position in which it can accommodate a group which is being transferred by said transfer means from a chamber of said first conveyor.

39. A structure as set forth in claim 37, wherein said transfer means comprises a plurality of discrete transfer members each of which is permanently aligned with one of said chambers and operating means for moving successive transfer members axially of the articles on said first conveyor to thereby transfer successively assembled groups into the open-ended packs on the respective pack supporting members.

40. A structure as set forth in claim 39, wherein said pack supporting members are hollow mandrels and said transfer members are movable into and through the respective mandrels to thereby strip open-ended packs off such mandrels and to simultaneously transfer the groups from the interior of the mandrels directly into the respective packs.

41. A structure as set forth in claim 39, further comprising a back support for each of said transfer members, said back supports being aligned with the respective transfer members, and operating means for moving said back supports against the open-ended packs on the respective pack supporting members while such packs are being stripped off the respective pack supporting members by said transfer members.

42. A structure as set forth in claim 34, wherein said means for delivering articles further comprises a plurality of channels extending between said source and said feeding means and arranged to convey the articles sideways by gravity feed, said feeding means comprising at least one rotary feeding member for each of said channels and each of said feeding members being provided with means for transferring articles seriatim from the respective channel to said first conveyor, said feeding members including a leading member and a trailing member and a group of articles being built up while a portion of said first conveyor advances from said trailing to said leading member.

43. A structure as set forth in claim 42, wherein the number of said channels equals the number of articles in a group.

44. A structure as set forth in claim 42, wherein each of said feeding members comprises a roller whose axis is at least substantially parallel with the axes of articles in said channels.

45. A structure as set forth in claim 44, wherein said rollers have axially extending peripheral recesses each dimensioned to accommodate one article at a time while facing the respective channel, said transferring means including at least one duct provided in each of said rollers and communicating with the respective recess, suction generating means, a source of compressed gas, and means for connecting said ducts with said suction generating means and with said cource of gas when the recesses respectively face the corresponding channels and said first conveyor so that an article is held by suction while being removed from a channel and is thereupon ejected onto said first conveyor, said means for moving the feeding means in synchronism with said conveyors comprising means for rotating said rollers at a speed such that each succeeding roller delivers an article in a position to continue the building up of a group whose first article was delivered by the trailing roller.

46. A structure as set forth in claim 34, wherein said feeding means comprises a chute having a discharge end movable between two positions, means for moving said discharge end from one of said positions to the other position at the speed of said first conveyor, means for returning said discharge end to said one position, and means for closing said discharge end during movement to said one position so that said discharge end supplies to the first conveyor a predetermined number of articles only during movement toward said other position.

47. A structure as set forth in claim 46, wherein said chute comprises means for subdividing its interior into a plurality of separate passages each of which delivers articles to said discharge end by gravity feed, and further comprising means for maintaining said discharge end at a constant distance from said first conveyor.

48. A structure as set forth in claim 34, wherein each of said groups comprises a plurality of superimposed articles and wherein said first conveyor is provided with a plurality of equidistant chambers each dimensioned to accommodate a group of articles, said feeding means being arranged to assemble groups of articles in successive chambers of said first conveyor and further comprising means for lowering successively introduced articles in said chambers so that each article covers substantially the same distance on its way from said feeding means to a position of rest in the respective chamber.

49. A structure as set forth in claim 34, wherein said first conveyor is provided with a plurality of equidistant chambers for said groups and comprises partitioning means subdividing each of said chambers into a plurality of compartments each of which is dimensioned to accommodate a layer of superimposed articles, such layers in their entirety forming a group of articles.

50. A structure as set forth in claim 34, wherein said first conveyor comprises a rotary turret having a peripheral surface provided with a plurality of equidistant chambers each of which is dimensioned to accommodate a group of articles, each of said chambers being open at both axial ends of said turret so that said transfer means may enter one axial end to expel a group of articles through the other axial end of a chamber.

51. A structure as set forth in claim 34, wherein said pack building means comprises a plurality of equidistant pack supporting members and wherein each such pack supporting member is movable with reference to said second conveyor.

52. A structure as set forth in claim 51, wherein said pack supporting members are arranged to orbit with said second conveyor about a fixed axis and wherein such pack supporting members are movable between first and second positions in which they respectively extend radially of and in parallelism with said fixed axis.

53. A structure as set forth in claim 34, further comprising a third conveyor disposed between said first and second conveyors and comprising compressing means for compacting the groups during transfer from said first conveyor to said second conveyor.

54. A structure as set forth in claim 34, further comprising a third endless conveyor, each of said conveyors comprising a turret and all of said turrets being arranged to rotate about a common axis, the turret of said second conveyor being disposed between the turrets of said first and third conveyors and said transfer means comprising a plurality of transfer members arranged to rotate with said turrets about said common axis and being movable in parallelism with said axis to shift successive groups from said first conveyor onto said second conveyor and to shift open-ended packs with groups of articles therein from said second conveyor to said third conveyor, and sealing means cooperating with the turret of said third conveyor for closing and sealing the ends of packs.

55. A structure as set forth in claim 54, further comprising a fourth and a fifth endless conveyor each having a turret rotatable about said common axis, the turret of said fourth conveyor being disposed between the turrets of said third and fifth conveyors and said transfer means comprising means for transferring sealed packs from said third conveyor to said fourth conveyor and thereupon to said fifth conveyor, means for applying additional blanks around sealed packs on said fourth conveyor so that such additional blanks form open-ended outer envelopes, and means for closing and sealing such open-ended envelopes on said fifth conveyor.

56. A structure as set forth in claim 54, further comprising means for supplying and applying labels to packs on said third conveyor.

57. A structure as set forth in claim 34, wherein said drive means is arranged to rotate said conveyors about a common axis and said pack building means comprises a plurality of equidistant hollow mandrels carried by said second conveyor for orbital movement about said axis, each of said mandrels being turnable between a radial and an axial position with reference to said axis and each thereof having open ends one of which faces said first conveyor when the mandrels are moved to axial positions so that each mandrel can receive a group of articles transferred by said transfer means and that such groups of articles may be expelled by said transfer means by way of the other open ends of said mandrels, and means for moving said mandrels between radial and axial positions in predetermined angular positions of the second conveyor.

58. A structure as set forth in claim 57, further comprising compressing means for compacting the groups of articles during transfer from said first to said second conveyor so that each of the thus compacted groups is readily accommodated in the respective mandrel.

59. A structure as set forth in claim 34, further comprising a third conveyor movable with said second conveyor and sealing means for sealing the ends of packs on said third conveyor, said transfer means comprising means for transferring packs with groups of articles therein from said second to said third conveyor and said sealing means comprising a plurality of equidistant receptacles carried by said third conveyor, said conveyors being rotatable by said drive means about a common axis and said receptacles being movable between radial and axial positions with reference to said axis and each thereof having two open ends, one of said open ends facing said second conveyor in the axial position of the respective receptacle so that said transfer means can transfer packs with groups of articles therein into the respective receptacle, and further comprising means for moving said receptacles between axial and radial positions in predetermined angular positions of said third conveyor.

60. A structure as set forth in claim 59, further comprising ejector means for expelling sealed packs from said receptacles.

61. A structure as set forth in claim 34, wherein said source of articles comprises a magazine and means for supplying articles to said magazine.

62. A structure as set forth in claim 34, wherein said drive means is arranged to move said conveyors at a constant speed and wherein each of said groups contains twenty articles.

63. A structure as set forth in claim 34, wherein each of said open-ended packs comprises an inner layer and an outer layer, one of said layers consisting of paper-like material and the other layer consisting of metallic foil.

64. A structure as set forth in claim 34, wherein said feeding means and said first conveyor are arranged to move the articles in such positions that the axes of the articles remain at least substantially horizontal at all times.

References Cited

UNITED STATES PATENTS

| | | | |
|---|---|---|---|
| 692,789 | 2/1902 | Landfear | 53—234X |
| 1,885,910 | 11/1932 | Gwinn et al. | 53—234X |
| 3,057,126 | 10/1962 | Chalmers et al. | 53—191X |
| 3,365,857 | 1/1968 | Liedtke | 53—236X |
| 3,426,503 | 2/1969 | Sherrill | 53—151X |

THERON E. CONDON, Primary Examiner

R. L. SPRUILL, Assistant Examiner

U.S. Cl. X.R.

53—137, 148, 192, 228, 234, 236, 252; 198—25, 35